United States Patent
Andrew et al.

(10) Patent No.: US 6,683,991 B1
(45) Date of Patent: Jan. 27, 2004

(54) METHOD AND APPARATUS FOR REPRESENTING A DIGITAL IMAGE TO PROVIDE A CODED REPRESENTATION

(75) Inventors: James Philip Andrew, Waverton (AU); Andrew Peter Bradley, Castlecrag (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/430,028

(22) Filed: Oct. 29, 1999

(30) Foreign Application Priority Data

Oct. 30, 1998 (AU) ............................................. PP6865

(51) Int. Cl.[7] ................................................ G06K 9/46
(52) U.S. Cl. ..................... 382/240; 382/232; 382/236; 358/1.9; 375/240.16
(58) Field of Search ................................. 382/232, 236, 382/238, 240, 248, 246; 348/388.1; 375/240.16, 240.24; 358/1.9

(56) References Cited

U.S. PATENT DOCUMENTS 5,754,793 A   5/1998   Eom et al. .................. 395/200
6,337,881 B1 * 1/2002 Chaddha ................ 375/240.16
6,392,705 B1 * 5/2002 Chaddha .................. 348/388.1

OTHER PUBLICATIONS

Andrew et al., "Coding Gain and Spatial Localisation Properties of Discrete Wavelet Transform Filters for Image Coding", IEE Proceedings, vol. 142, Bo. 3, Jun. 1995, pps. 133–140.*

* cited by examiner

Primary Examiner—Anh Hong Do
(74) Attorney, Agent, or Firm—Fitzpatrick, Cella, Harper & Scinto

(57) ABSTRACT

The method encodes a digital image to provide a compressed coded representation of the image. The method firstly performs a multi-level 2-D DWT transform (410) on the entire image, which is arranged in a hierarchical order (420). The sub-bands of the transform are then tiled (430) into a number of blocks. The method then embed-bitplane encodes (440) each block to visually lossless point. Afterwards, each encoded block is terminated (450) at a bitplane that minimizes image distortion based on determined distortion measures and a desired total of determined block rates. Finally, the method concatenates (460) the said terminated encoded blocks to form the coded representation.

67 Claims, 12 Drawing Sheets

Overview of the quadtree coder

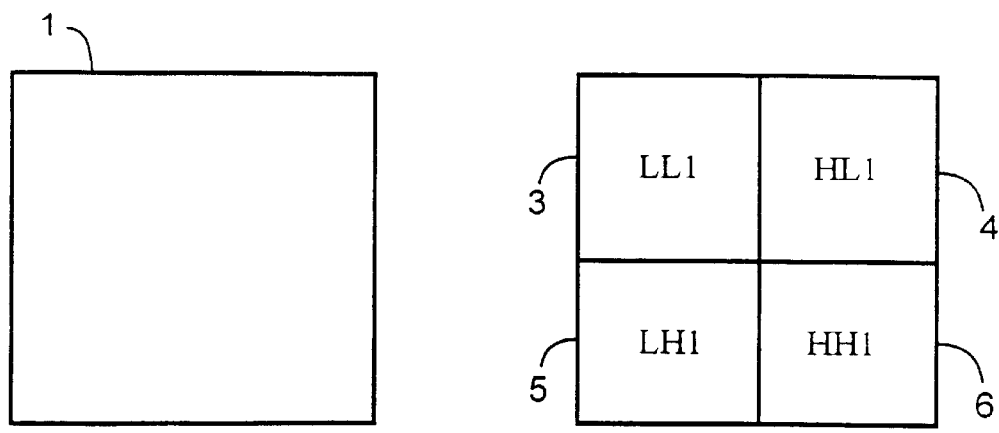
Fig. 1 One level DWT
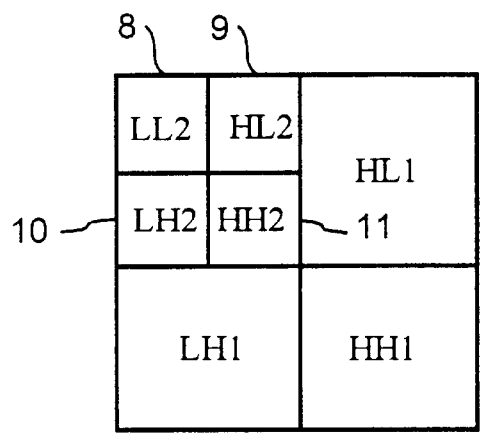
Fig. 2
Two level DWT
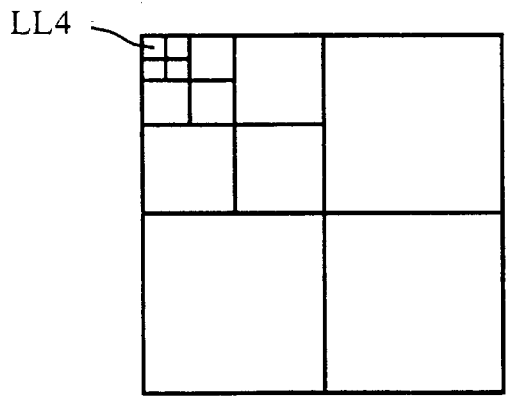
Fig. 3
Four level DWT Overview of the encoder

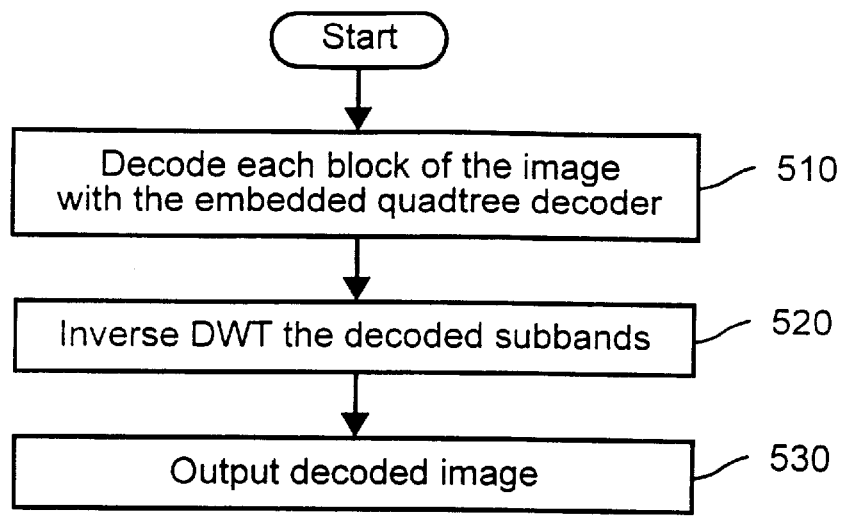
Fig. 5  Overview of the decoder
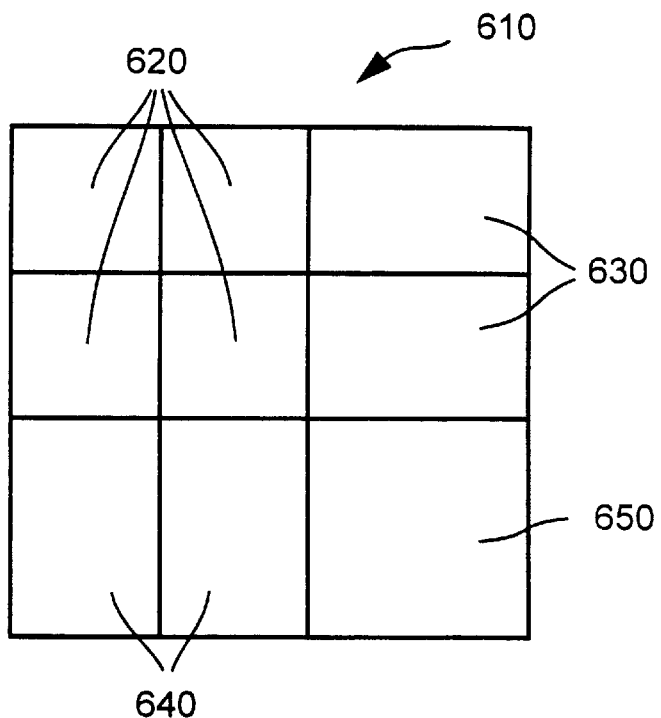
Fig. 6  Tiling of the subbands

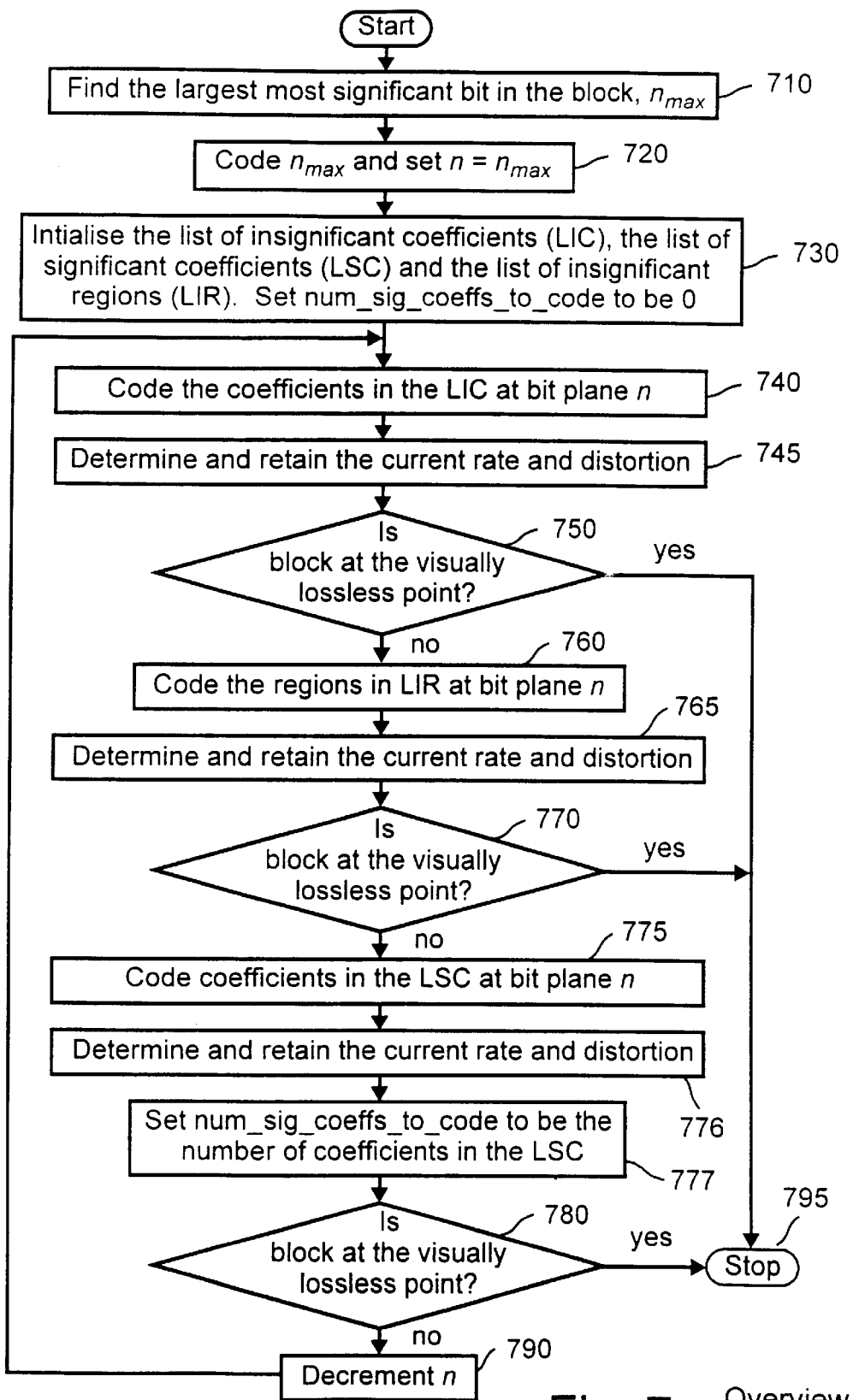
Fig. 7  Overview of the quadtree coder

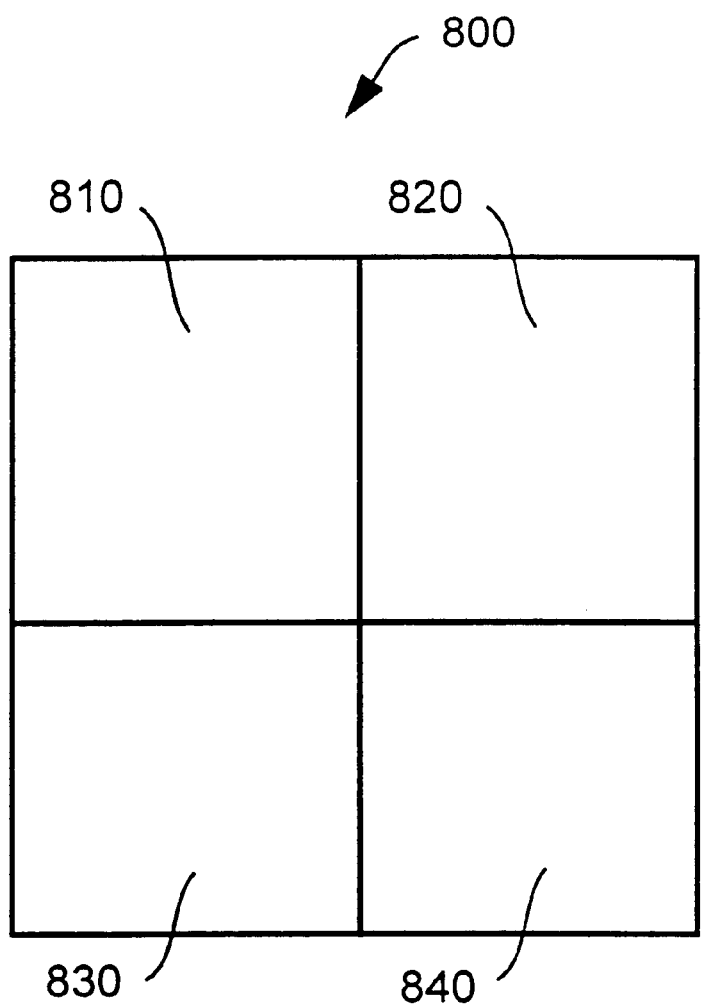
Fig. 8   Quadtree partition

Coding the LIR at bit plane n

Coding the LIC at bit plane $n$

Coding the LSC at bit plane *n*

Fig. 12  Calculation of the optimum block code termination point

Fig. 13  Calculation of the perceptual distortion

The threshold elevation function,
$TE = \min(m, \max(t, b \cdot pool(|c|)))$

METHOD AND APPARATUS FOR REPRESENTING A DIGITAL IMAGE TO PROVIDE A CODED REPRESENTATION

FIELD OF INVENTION

The present invention relates to an encoder method and apparatus for representing a digital image to provide a coded representation. The invention also relates to a computer program product including a computer readable medium having recorded thereon a computer program for representing a digital image to provide a coded representation.

BACKGROUND OF INVENTION

The publication U.S. Pat. No. 5,754,793 discloses a wavelet based image compression scheme that utilises a human visual system (HVS model). The method adjusts quantisation both spectrally and spatially by having a quantisation factor based on edge state and background brightness for each coefficient in the DC subband, which is subsequently weighted by DWT level and orientation. The quantisation factors require no transmission overhead, but the method does require that there is no quantisation of the DC coefficients. It is in this way that the quantisation factors are able to be determined at both the encoder and the decoder. This limits the compression performance of the method and has the disadvantage of reducing the accuracy of the spatial adaption when the number of levels in the DWT increases, which is often required for high compression ratios. In addition, the method disclosed in the '793 patent can not adapt to different viewing conditions or displays because the subband quantisation factors are stored in a look-up-table at the decoder. The method can also not be applied to a memory constrained coder because it requires coefficients from the DC subband to estimate the contrast masking in each subband.

SUMMARY OF THE INVENTION

It is an object of the present invention to ameliorate one or more disadvantages of the prior art.

According to one aspect of the invention there is provided a method of representing a digital image to provide a coded representation. The method comprises the steps of transforming the digital image to derive a plurality of blocks of coefficients, and embedded quadtree bitplane encoding, in one or more passes per bitplane, each block of coefficients. The method further comprises the steps of determining a block rate for each encoded pass of each block, determining a distortion measure for each encoded pass of each block, terminating each encoded block at an encoded pass that minimizes image distortion based on the distortion measures for a predetermined total of the block rates, and concatenating the terminated encoded blocks to form the coded representation.

According to another aspect of the invention there is provided a method of representing a digital image to provide a coded representation. The method includes the steps of transforming the digital image to derive a plurality of blocks of coefficients, and embedded quadtree bitplane encoding, in one or more passes per bitplane, each block of coefficients. A block rate is determined for each encoded pass of each block, and a distortion measure is determined for each encoded pass of each block. Each encoded block is terminated at a encoded pass that minimizes a total block rate based on the block rates for a predetermined image distortion. The terminated encoded blocks are concatenated to form the coded representation.

According to another aspect of the invention there is provided a method of representing a digital image to provide a coded representation. The method comprises the step of transforming the digital image to derive a plurality of blocks of original coefficients, wherein each block has a corresponding maximum bitplane and a corresponding minimum bitplane. The method further comprises the step of embedded quadtree bitplane encoding, in one or more passes per bitplane, each block of coefficients from the corresponding maximum bitplane to the corresponding minimum bit plane. A block rate is determined for each encoded pass of each bitplane of each block, wherein the block rate for a designated encoded pass of a designated bitplane of a designated block is representative of the number of code bits coded during the embedded quadtree bitplane encoding step of the designated block from its corresponding maximum bitplane to a respective at least one part of the designated bitplane. A distortion measure is determined for each encoded pass of each bitplane of each block, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block. Each encoded block is terminated at an encoded pass that minimizes image distortion based on the distortion measures for a predetermined total of block rates, and the terminated encoded blocks are concatenated to form the coded representation.

According to another aspect of the invention there is provided a method of representing a digital image to provide a coded representation. The method comprises the step of transforming the digital image to derive a plurality of blocks of original coefficients, wherein each block has a corresponding maximum bitplane and a corresponding minimum bitplane. The method further comprises the step of embedded quadtree bitplane encoding, in one or more passes per bitplane, each block of coefficients from the corresponding maximum bitplane to the corresponding minimum bit plane. The method further comprises the step of determining a block rate for each encoded pass of each bitplane of each block, wherein the block rate for a designated encoded pass of a designated bitplane of a designated block is representative of the number of code bits coded during the embedded quadtree bitplane encoding step of the designated block from its corresponding maximum bitplane to a respective at least one part of the designated bitplane. A distortion measure is determined for each encoded pass of each bitplane of each block, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block. Each encoded block is terminated at an encoded pass that minimizes a total block rate based on the block rates for a predetermined image distortion, and the terminated encoded blocks are concatenated to form the coded representation.

According to another aspect of the invention there is provided an apparatus for representing a digital image to provide a coded representation. The apparatus comprises means for transforming the digital image to derive a plurality of blocks of coefficients, means for embedded quadtree bitplane encoding, in one or more passes per bitplane, each block of coefficients, and means for determining a block rate for each encoded pass of each block. The apparatus further comprises means for determining a distortion measure for each encoded pass of each block, means for terminating each encoded block at an encoded pass that minimizes image distortion based on the distortion measures for a predetermined total of the block rates, and means for concatenating the terminated encoded blocks to form the coded representation.

According to another aspect of the invention there is provided an apparatus for representing a digital image to provide a coded representation. The apparatus comprises means for transforming the digital image to derive a plurality of blocks of coefficients, means for embedded quadtree bitplane encoding, in one or more passes per bitplane, each block of coefficients, and means for determining a block rate for each encoded pass of each block. The apparatus further comprises means for determining a distortion measure for each encoded pass of each block, means for terminating each encoded block at an encoded pass that minimizes a total block rate based on the block rates for a predetermined image distortion, and means for concatenating the terminated encoded blocks to form the coded representation.

According to another aspect of the invention there is provided an apparatus for representing a digital image to provide a coded representation. The apparatus comprises means for transforming the digital image to derive a plurality of blocks of original coefficients, wherein each block has a corresponding maximum bitplane and a corresponding minimum bitplane. The apparatus further comprises means for embedded quadtree bitplane encoding, in one or more passes per bitplane, each block of coefficients from the corresponding maximum bitplane to the corresponding minimum bit plane. First determination means is included for determining a block rate for each encoded pass of each bitplane of each block, wherein the block rate for a designated encoded pass of a designated bitplane of a designated block is representative of the number of code bits coded during the embedded quadtree bitplane encoding step of the designated block from its corresponding maximum bitplane to a respective at least one part of the designated bitplane. Second determination means is included for determining a distortion measure for each encoded pass of each bitplane of each block, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block. The apparatus further comprises means for terminating each encoded block at a an encoded pass that minimizes image distortion based on the distortion measures for a predetermined total of block rates, and means for concatenating the terminated encoded blocks to form the coded representation.

According to another aspect of the invention there is provided an apparatus for representing a digital image to provide a coded representation. The apparatus comprises means for transforming the digital image to derive a plurality of blocks of original coefficients, wherein each block has a corresponding maximum bitplane and a corresponding minimum bitplane. The apparatus further comprises means for embedded quadtree bitplane encoding, in one or more passes per bitplane, each block of coefficients from the corresponding maximum bitplane to the corresponding minimum bit plane. First determination means is included for determining a block rate for each encoded pass of each bitplane of each block, wherein the block rate for a designated encoded pass of a designated bitplane of a designated block is representative of the number of code bits coded during the embedded quadtree bitplane encoding step of the designated block from its corresponding maximum bitplane to a respective at least one part of the designated bitplane. Second determination means is included for determining a distortion measure for each encoded pass of each bitplane of each block, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block. The apparatus further comprises means for terminating each encoded block at an encoded pass that minimizes a total block rate based on the block rates for a predetermined image distortion, and means for concatenating the terminated encoded blocks to form the coded representation.

According to another aspect of the invention there is provided a computer program product including a computer readable medium having recorded thereon a computer program for representing a digital image to provide a coded representation. The computer program product comprises means for transforming the digital image to derive a plurality of blocks of coefficients, means for embedded quadtree bitplane encoding, in one or more passes per bitplane, each block of coefficients, and means for determining a block rate for each encoded pass of each block. The computer program product further comprises means for determining a distortion measure for each encoded pass of each block, means for terminating each encoded block at an encoded pass that minimizes image distortion based on the distortion measures for a predetermined total of block rates, and means for concatenating the terminated encoded blocks to form the coded representation.

According to another aspect of the invention there is provided a computer program product including a computer readable medium having recorded thereon a computer program for representing a digital image to provide a coded representation. The computer program product comprises means for transforming the digital image to derive a plurality of blocks of coefficients, means for embedded quadtree bitplane encoding, in one or more passes per bitplane, each block of coefficients, and means for determining a block rate for each encoded pass of each block. The computer program product further comprises means for determining a distortion measure for each encoded pass of each block, means for terminating each encoded block at an encoded pass that minimizes a total block rate based on the block rates for a predetermined image distortion, and means for concatenating the terminated encoded blocks to form the coded representation.

According to another aspect of the invention there is provided a computer program product including a computer readable medium having recorded thereon a computer program for representing a digital image to provide a coded representation. The computer program product comprises means for transforming the digital image to derive a plurality of blocks of original coefficients, wherein each block has a corresponding maximum bitplane and a corresponding minimum bitplane. The computer program product further comprises means for embedded quadtree bitplane encoding, in one or more passes per bitplane, each block of coefficients from the corresponding maximum bitplane to the corresponding minimum bit plane. First determination means is included for determining a block rate for each encoded pass of each bitplane of each block, wherein the block rate for a designated encoded pass of a designated bitplane of a designated block is representative of the number of code bits coded during the embedded quadtree bitplane encoding step of the designated block from its corresponding maximum bitplane to a respective at least one part of the designated bitplane. Second determination means is included for determining a distortion measure for each encoded pass of each bitplane of each block. The distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block. The computer program product further comprises means for terminating each encoded block at the encoded pass that minimizes image distortion based on the distortion measures for a predetermined total of block rates, and means for concatenating the terminated encoded blocks to form the coded representation.

According to another aspect of the invention there is provided a computer program product including a computer readable medium having recorded thereon a computer program for representing a digital image to provide a coded representation. The computer program product comprises means for transforming the digital image to derive a plurality of blocks of original coefficients, wherein each block has a corresponding maximum bitplane and a corresponding minimum bitplane. The computer program product further comprises means for embedded quadtree bitplane encoding, in one or more passes per bitplane, each block of coefficients from the corresponding maximum bitplane to the corresponding minimum bit plane. First determination means is included for determining a block rate for each encoded pass of each bitplane of each block. The block rate for a designated encoded pass of a designated bitplane of a designated block is representative of the number of code bits coded during the embedded quadtree bitplane encoding step of the designated block from its corresponding maximum bitplane to a respective at least one part of the designated bitplane. Second determination means is included for determining a distortion measure for each encoded pass of each bitplane of each block. The distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block. The computer program product further comprises means for terminating each encoded block at an encoded pass that minimizes a total block rate based on the block rates for a predetermined image distortion, and means for concatenating the terminated encoded blocks to form the coded representation.

According to another aspect of the invention there is provided a method of representing a digital image to provide a coded representation. The method comprises the steps of transforming the digital image to derive a plurality of blocks of coefficients, embedded quadtree bitplane-coding, in one or more passes per bitplane, each block of coefficients, and determining a block rate for each encoded pass of each block. The method further comprises the steps of determining a distortion measure for each encoded pass of each block, terminating each encoded block at an encoded pass that minimizes a weighted sum of the image distortion based on the distortion values, and the total of the block rates, and concatenating the terminated encoded blocks to form the coded representation.

According to another aspect of the invention there is provided a method of representing a digital image to provide a coded representation. The method comprises the step of transforming the digital image to derive a plurality of blocks of original coefficients, wherein each block has a corresponding maximum bitplane and a corresponding minimum bitplane. The method further comprises the step of embedded quadtree bitplane encoding, in one or more passes per bitplane, each block of coefficients from the corresponding maximum bitplane to the corresponding minimum bit plane. A block rate is determined for each encoded pass of each bitplane of each block. The block rate for a designated encoded pass of a designated bitplane of a designated block is representative of the number of code bits coded during the embedded quadtree bitplane encoding step of the designated block from its corresponding maximum bitplane to a respective at least one part of the designated bitplane. A distortion measure is determined for each encoded pass of each bitplane of each block. The distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block. The method further comprises the steps of terminating each encoded block at an encoded pass according to a function of the determined rates and distortion values, and concatenating the terminated encoded blocks to form the coded representation.

According to another aspect of the invention there is provided a method of representing a digital image to provide a coded representation. The method comprises the steps of: (i) transforming the digital image to derive a plurality of blocks of coefficients; (ii) embedded bitplane encoding, in one or more passes per bitplane, each block of coefficients; (iii) determining a rate for each encoded pass of each block; (iv) determining a distortion measure for each encoded pass of each bitplane of each block, wherein the step of determining a distortion measure comprises the sub-steps of: (iv)(a) generating, for each original coefficient of each block, a weighted sum of magnitudes of neighboring coefficients; (iv)(b) calculating a threshold elevation, for each original coefficient of each block, based on the weighted sum; (iv)(c) calculating a distortion value for each coefficient for each encoded pass of each block, wherein the distortion value for a designated encoded coefficient for a designated encoded pass of a designated block is based on the threshold elevation for the original coefficient corresponding to the designated encoded coefficient, and a value of the designated encoded coefficient as decoded from the encoded passes from the maximum bitplane corresponding to the designated block to respective at least one part of the designated bitplane; and (iv)(d) pooling the distortion values for each encoded coefficients to derive the distortion measure for each encoded pass of each bitplane of each block. The method further comprises the steps of (v) terminating each encoded block at an encoded pass according to a function of the determined rates and distortion values; and (vi) concatenating the terminated encoded blocks to form the coded representation.

According to another aspect of the invention there is provided an apparatus for representing a digital image to provide a coded representation. The apparatus comprises means for transforming the digital image to derive a plurality of blocks of coefficients, means for embedded quadtree bitplane-encoding, in one or more passes per bitplane, each block of coefficients, and means for determining a block rate for each encoded pass of each block. The apparatus further comprises means for determining a distortion measure for each encoded pass of each block, means for terminating each encoded block at an encoded pass that minimizes a weighted sum of the image distortion based on the distortion values, and the total of the block rates, and means for concatenating the terminated encoded blocks to form the coded representation.

According to another aspect of the invention there is provided an apparatus for representing a digital image to provide a coded representation. The apparatus comprises means for transforming the digital image to derive a plurality of blocks of original coefficients, wherein each block has a corresponding maximum bitplane and a corresponding minimum bitplane. The apparatus further comprises means for embedded quadtree bitplane encoding, in one or more passes per bitplane, each block of coefficients from the corresponding maximum bitplane to the corresponding minimum bit plane. The apparatus further comprises means for determining a block rate for each encoded pass of each bitplane of each block. The block rate for a designated encoded pass of a designated bitplane of a designated block is representative of the number of code bits coded during the embedded quadtree bitplane encoding step of the designated block from its corresponding maximum bitplane to a respective least one part of the designated bitplane. The apparatus further comprises means for determining a distortion measure for each encoded pass of each bitplane of each block. The distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block. The apparatus further comprises means for terminating each encoded block at an encoded pass according to a function of the determined rates and distortion values, and means for concatenating the terminated encoded blocks to form the coded representation.

According to another aspect of the invention there is provided an apparatus for representing a digital image to provide a coded representation. The apparatus comprises means for transforming the digital image to derive a plurality of blocks of coefficients, and means for embedded bitplane encoding, in one or more passes per bitplane, each block of coefficients. The apparatus further comprises first determination means for determining a rate for each encoded pass of each block, and second determination means for determining a distortion measure for each encoded pass of each bitplane of each block. The second determination means comprises means for generating, for each original coefficient of each block, a weighted sum of magnitudes of neighboring coefficients, and means for calculating a threshold elevation, for each original coefficient of each block, based on the weighted sum. The second determination means further comprises means for calculating a distortion value for each encoded coefficient for each encoded pass of each block, wherein the distortion value for a designated encoded coefficient for a designated encoded pass of a designated block is based on the threshold elevation for the original coefficient corresponding to the designated encoded coefficient, and a value of the designated encoded coefficient as decoded from the encoded passes from the maximum bitplane corresponding to the designated block to respective at least one part of the designated bitplane. The second determination means further comprises means for pooling the distortion values for each encoded coefficients to derive the distortion measure for each encoded pass of each bitplane of each block. The apparatus further comprises means for terminating each encoded block at an encoded pass according to a function of the determined rates and distortion values, and means for concatenating the terminated encoded blocks to form the coded representation.

According to another aspect of the invention there is provided a computer program product including a computer readable medium having recorded thereon a computer program for representing a digital image to provide a coded representation. The computer program product comprises means for transforming the digital image to derive a plurality of blocks of coefficients, means for embedded quadtree bitplane-encoding, in one or more passes per bitplane, each block of coefficients, and means for determining a block rate for each encoded pass of each block. The apparatus further comprises means for determining a distortion measure for each encoded pass of each block, means for terminating each encoded block at an encoded pass that minimizes a weighted sum of the image distortion based on the distortion values, and the total of the block rates, and means for concatenating the terminated encoded blocks to form the coded representation.

According to another aspect of the invention there is provided a computer program product including a computer readable medium having recorded thereon a computer program for representing a digital image to provide a coded representation. The computer program product comprises means for transforming the digital image to derive a plurality of blocks of original coefficients, wherein each block has a corresponding maximum bitplane and a corresponding minimum bitplane. The computer program product further comprises means for embedded quadtree bitplane encoding, in one or more passes per bitplane, each block of coefficients from the corresponding maximum bitplane to the corresponding minimum bit plane. Means for determining a block rate for each encoded pass of each bitplane of each block is included, wherein the block rate for a designated encoded pass of a designated bitplane of a designated block is representative of the number of code bits coded during the embedded quadtree bitplane encoding step of the designated block from its corresponding maximum bitplane to a respective least one part of the designated bitplane. Means for determining a distortion measure for each encoded pass of each bitplane of each block is included, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block. The apparatus further includes means for terminating each encoded block at an encoded pass according to a function of the determined rates and distortion values, and means for concatenating the terminated encoded blocks to form the coded representation.

According to another aspect of the invention there is provided a computer program product including a computer readable medium having recorded thereon a computer program for representing a digital image to provide a coded representation. The computer program product comprises means for transforming the digital image to derive a plurality of blocks of coefficients, means for embedded bitplane encoding, in one or more passes per bitplane, each block of coefficients, and first determination means for determining a rate for each encoded pass of each block. The computer program product further comprises second determination means for determining a distortion measure for each encoded pass of each bitplane of each block. The second determination means comprises means for generating, for each original coefficient of each block, a weighted sum of magnitudes of neighboring coefficients, and means for calculating a threshold elevation, for each original coefficient of each block, based on the weighted sum. The second determination means further comprises means for calculating a distortion value for each encoded coefficient for each encoded pass of each block, wherein the distortion value for a designated encoded coefficient for a designated encoded pass of a designated block is based on the threshold elevation for the original coefficient corresponding to the designated encoded coefficient, and a value of the designated encoded coefficient as decoded from the encoded passes from the maximum bitplane corresponding to the designated block to respective at least one part of the designated bitplane. The second determination means further comprises means for pooling the distortion values for each encoded coefficients to derive the distortion measure for each encoded pass of each bitplane of each block. The computer program product further comprises means for terminating each encoded block at an encoded pass according to a function of the determined rates and distortion values, and means for concatenating the terminated encoded blocks to form the coded representation.

BRIEF DESCRIPTION OF THE DRAWINGS

Embodiments of the invention are described with reference to the drawings, in which:

FIG. 1 shows an original image and first level DWT of that image;

FIG. 2 shows a second level DWT of the original image of FIG. 1;

FIG. 3 shows a fourth level DWT of the original image of FIG. 1;

FIG. 5 is a flow diagram of a decoding process for decoding images encoded in accordance with the preferred method shown in FIG. 4;

FIG. 6 illustrates a tiled subband;

FIG. 7 is a flow diagram of the encoding process used in step 440 of FIG. 4;

FIG. 8 illustrates a block partitioned in accordance with the quadtree partitioning method;

DETAILED DESCRIPTION

Figure 4:
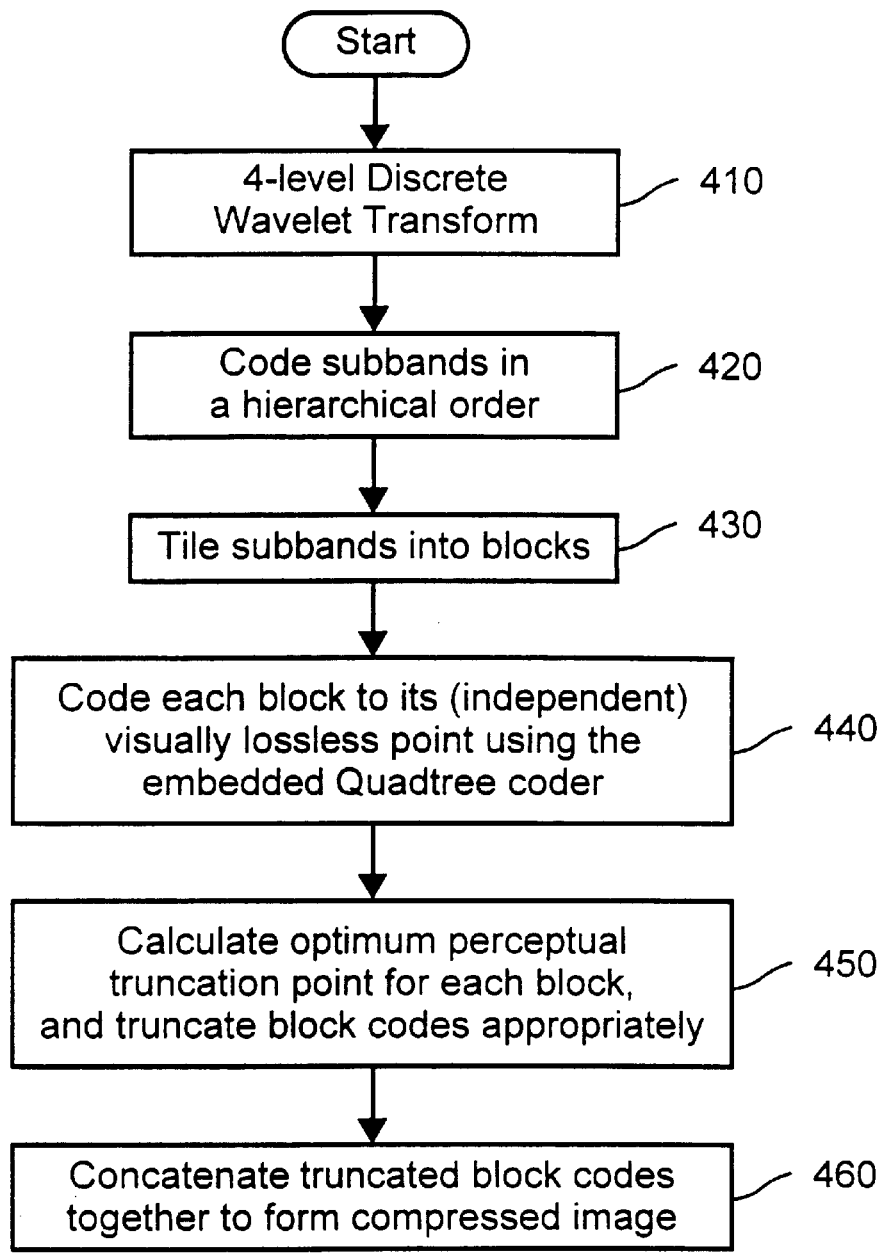
FIG. 4 is a flow diagram of the encoding process of the preferred embodiment.

Where reference is made in any one or more of the accompanying drawings to steps and/or features, which have the same reference numerals, those steps and/or features have for the purposes of this description the same function (s) or operation(s), unless the contrary intention appears.

Preferred Embodiment(s) of Method

The preferred embodiment proceeds initially by means of a wavelet transform of image data. A description of the wavelet transform process is given in many standard texts and in particular the book "Wavelets for Computer Graphics," by I. Stollinitz et. al. published in 1996 by Morgan Kaufmann Publishers Inc. An overview of the wavelet process will now be described with reference to the accompanying drawings.

Discrete Wavelet Transform

Referring initially to FIG. 1, an original image 1 is transformed utilising a Discrete Wavelet Transform (DWT) into four sub-images 3–6. The sub-images or subbands are normally denoted LL1, HL1, LH1 and HH1. The one suffix on the subband names indicates level 1. The LL1 subband is a low pass decimated version of the original image.

The wavelet transform utilised can vary and can include, for example, Haar basis functions, Daubechies basis functions etc. The LL1 subband is then in turn utilised and a second Discrete Wavelet Transform is applied as shown in FIG. 2 giving subbands LL2 (8), HL2 (9), LH2 (10), HH2 (11). This process is continued for example as illustrated in FIG. 3 wherein the LL4 subband is illustrated. Obviously, further levels of decomposition can be provided depending on the size of the input image. The lowest frequency subband is referred to as the DC subband. In the case of FIG. 3, the DC subband is the LL4 subband.

Each single level DWT can, in turn, be inverted to obtain the original image. Thus, a J-level DWT can be inverted as a series of J-single level inverse DWT's.

To code an image hierarchically the DC subband is coded first. Then, the remaining subbands are coded in order of decreasing level. That is for a 4 level DWT, the subbands at level 4 are coded after the DC subband (LL4). That is the HL4, LH4 and HH4 subbands. The subbands at level 3 (HL3, LH3, and HH3) are then coded, followed by those at level 2 (HL2, LH2 and HH2) and then level 1 (HL1, LH1 and HH1).

With standard images, the encoded subbands normally contain the "detail" information in an image. Hence, they often include a sparse array of values and substantial compression can be achieved by quantisation of the subbands and efficient encoding of their sparse matrix form.

An Overview of the Encoding and Decoding Process

An overview of the coding process is illustrated in FIG. 4, while the decoding process is illustrated in FIG. 5. Dependent on the format of the input image, the display device, and ambient lighting conditions it may be necessary to pre-process the image before coding it and to post-process the image after decoding. This allows explicit modelling of the luminance masking effects and requires modelling of both the luminance function of the display and luminance sensitivity of the human eye. These functions are known in the prior art and are normally modelled using either logarithmic or power law models. In the preferred embodiment it is assumed that image grey levels are approximately a linear function of the perceived brightness seen by a human observer. This removes the need for this non-linear pre and ppst-processing in the majority of cases.

Turning initially to FIG. 4, a digital image is transformed 410 using a Discrete Wavelet Transform into several subband components as previously described. Preferably each subband is coded in a hierarchical order 420: specifically in the order DC, HL4, LH4, HH4, HL3, LH3, HH3, HL2, LH2, HH2, HL1, LH1 and HH1. The subbands are tiled into a number of blocks 430. In general, each block can be coded to an arbitrary mimimum bitplane with the preferred quadtree embedded coder 440. Specifically, each block is preferably coded to a visually lossless point. After all the blocks and subbands are coded the optimum truncation point for each block is determined in step 450. Each block is then truncated accordingly and the codes for the blocks are concatenated into the output bit stream in step 460 with an appropriate coded image header.

A coded digital image is decoded as illustrated in FIG. 5. In step 510 each block of each of the subbands of the image are decoded with the quadtree decoder. In step 520 the decoded subbands are inversed discrete wavelet transformed. In step 530 the decoded image is output.

A more detailed description of each of the encoding steps of FIG. 4: 430, 440, 450 and 460 are described with reference to FIGS. 6 to 14.

Subband Tiling

Turning now to FIG. 6, there is shown the result of step 430 of FIG. 4 on subband 610. The subband 610, is tiled into a number of blocks 620, 630, 640 and 650. The subband is preferably tiled with 32×32 blocks of coefficients beginning from the top left-hand corner. The nomenclature 32×32 refers to 32 rows by 32 columns respectively. The minimum block size of the tiles is 32×32. In the case where a subband is not a multiple of the minimum block size, the edge blocks are extended in size to be larger than 32×32 but smaller than 64×64. For example, for a subband 610 in FIG. 6 of size 110×112 coefficients there are four 32×32 subbands (620) two 32×48 subbands (630), two 46×32 subband (640) and one 46×48 subband (650). Step 430 is performed only on those subbands greater or equal to the minimum block size.

Embedded Quadtree Coding

Before proceeding with a description of the embodiments, a brief review of terminology used hereinafter is provided. For a binary integer representation of a number, "bit n" or "bit number n" refers to the binary digit n places to the left of the least significant bit (beginning with bit 0). For example, assuming an 8-bit binary representation, the decimal number 9 is represented as 00001001. In this number, bit 3 is equal to 1, while bits 2, 1, and 0 are equal to 0, 0, and 1, respectively. In addition, a transform of an image may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this three-dimensional space that passes through each bit sequence at the same bitnumber is referred to as a "bitplane" or "bit plane". The term "bit plane number n" refers to that bit plane that passes through bit number n.

A region of an image frame includes a set of contiguous image coefficients. The term coefficient is used hereinafter interchangeably with pixel, however, as will be well understood by a person skilled in the art, the former is typically used to refer to pixels in a transform domain (eg., a DWT domain). These sets or regions T are defined as having transform image coefficients $\{c_{i,j}\}$, where (i,j) is a coefficient coordinate.

A set or the region T of pixels at a current bit plane is said to be insignificant if the msb number of each coefficient in the region is less than the value of the current bit plane. To make the concept of region significance precise, a mathematical definition is given in Equation (1). A set or region T of pixels is said to be insignificant with respect to (or at) bit plane n if, $$|c_{i,j}| < 2^n, \text{ for all } c_{i,j} \in T \qquad (1)$$

By a partition of a set T of coordinates we mean a collection $\{T_m\}$ of subsets of T such that $$T = \bigcup_m T_m, \ T_n \cap T_m = 0 \forall n \neq m \qquad (1a)$$

In other words if $c_{i,j} \in T$ then $c_{i,j} \in T_m$ for one, and only one, of the subsets $T_m$. Preferably, T is a square region and the set $\{T_m\}$ is the set consisting of the four quadrants of T.

The preferred method encodes a set of coefficients in an embedded manner using quadtree partitions. The use of the term embedded and variations such as embed, is taken to mean that every bit in a higher bit plane is coded before any bit in a lower bit plane. For example, every bit is coded in bit plane 7 before any bit in bit plane 6. In turn, all bits in bit plane 6 are coded before any bit plane 5 and so on. That is bit plane n is coded and put into the coded bitstream before bitplane n−1. Preferably, each bit plane is coded in three passes: namely the LIC, LIR, and LSC passes as will be discussed below.

FIG. 7 is a flow diagram of the preferred embedded quadtree coding process used in step 440 of FIG. 4 in more detail. In step 440, a block of coefficients is preferably coded using the preferred embedded quadtree coding process to a visually lossless point. The DWT coefficients are assumed to be represented in a signed magnitude form with a finite number of bits. Preferably we use 15 bits to represent the magnitude of the DWT coefficients and an extra sign bit to give 16 bits in total. Of course using such a finite number of bits is a form of quantisation. However, for 8 bit (per colour) input images the image represented by the 16 bit DWT coefficients is usually well below the visual distortion threshold.

In step 710 the most significant bit of all the coefficients in the block, $n_{max}$, is determined. That is $n_{max}$ is the smallest integer n satisfying, $$2^{n+1} > |c| \qquad (2)$$

for all coefficients c in the block. In step 720, the bit plane variable n is set to $n_{max}$.

In step 730, a list of insignificant coefficients (LIC), a list of significant coefficients (LSC) and a list of insignificant regions (LIR) are initialised. The LIC and LSC are initialised to be empty. The LIR is initialised to be the four quadrants of the block. The variable, num_sig_coeffs_to_ code is initialised to be 0. These lists, and how they are coded, is detailed in more detail below. If the list is empty however, the process continues onto the next coding step without coding that empty list.

In step 740, bit n of each coefficient in the LIC is coded. Initially, bit n is set to $n_{max}$ and is decremented for each pass of the loop 740 to 790. At step 745, the current block rate and distortion are calculated. The current rate is simply the number of bits used to code the block so far. Given the coded bit stream, a decoder following the reverse of the coding procedure is able to decode each coefficient up to a bit precision of n+1, and further the coefficients in the current LIC up to a bit precision of n. The current block distortion is the distortion between the actual block data and the block that the decoder would reconstruct given the current code for the block. The value that a decoder would reconstruct for each coefficient in a block is discussed in more detail below. In addition, the distortion calculation is discussed in more detail with reference to FIG. 13. The current block distortion is then tested against the visual threshold in step 750. If the distortion is below the visual threshold the process terminates at step 795. If the block is not below the visual threshold processing continues at step 760.

At step 760, each region in the list of insignificant regions is coded at bit plane n. The current block rate and distortion is calculated in step 765. The current block distortion is tested against the visual threshold in step 770. If the distortion is below the visual threshold the process terminates at step 795. If the block is not below the visual threshold processing continues at step 775.

At step 775, bit n of each coefficient in the list of significant coefficients is coded. At step 776, the current block rate and distortion are determined. At step 777, num_sig_coeffs_to_code is set to the number of coefficients in the LSC. This variable is used so that the significant coefficients that are added to the LSC in steps 740 and 760 are not coded during the current pass. The current block distortion is tested against the visual threshold in step 780. If the distortion is below the visual threshold the process terminates at step 795. If the block is not below the visual threshold processing continues at step 790. As mentioned previously, each block may be encoded to an arbitrary bitplane. In this embodiment, decision blocks 750 and 770 may be omitted, and decision block 780 may instead check whether the present bitplane n is equal or less than the arbitrary selected minimum bitplane. If so, then the process terminates at step 795.

At step 790, the current bit plane variable n is decremented and processing continues at step 740.

The current rate and distortion measuring steps 745, 765, and 776 are performed during the encoding of the bitplanes. Alternatively, these determining steps can be performed after the encoding process.

Encoding the LIR List

The list of insignificant regions is a list, or vector, of regions. A region is a sub-block of the block of coefficients. A region (within the block) can be described by the top left-hand corner coordinate of the region within the block and by the region size. The list of insignificant regions is initialised with 4 regions: namely the four quadrants in the block.

Referring to FIG. 8, if 800 represents the block then the four regions are 810, 820, 830 and 840. These regions are put into the LIR in this order.

Figure 9:
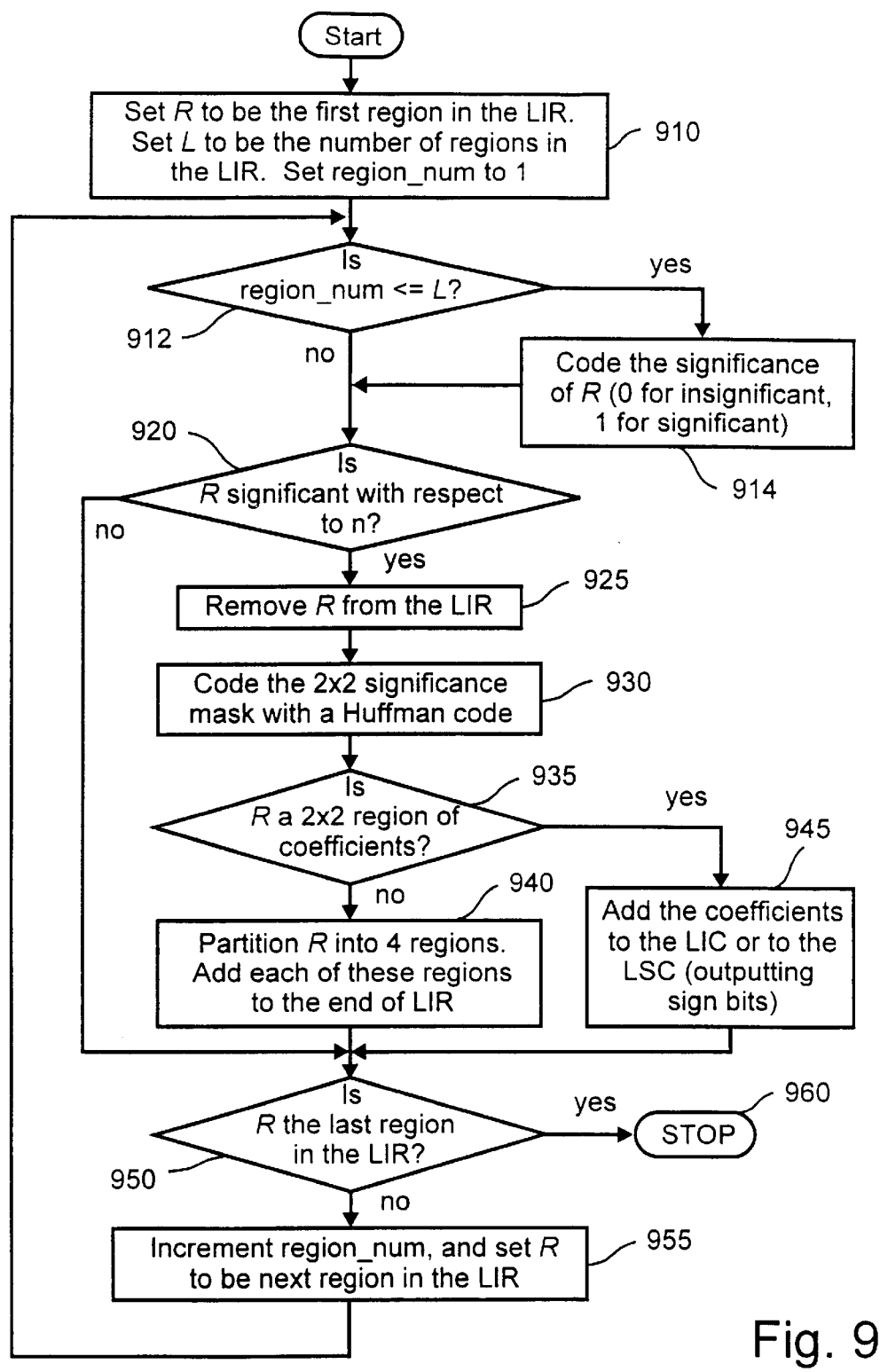
FIG. 9 is a flow diagram of the LIR encoding process as used in step 760 of FIG. 7.

Referring to FIG. 9, the LIR is coded at bit plane n at step 760 of FIG. 7 as follows. In step 910, the current region R is set to the first region in the LIR, L is set to the number of regions in the LIR, and region_num, the index of the current region in the LIR, is set to 1. In decision block 912 a check is made to determine if region_num is less than or equal to L. If decision block 912 returns a yes, processing continues at step 914. At step 914, the significance of region R is output. A coefficient c is insignificant at bit plane n if, $$|c| < 2^n \quad (3)$$

A region is insignificant at bit plane n if all coefficients in the region are insignificant at bit plane n. A region or coefficient is significant at bit plane n if it is not insignificant at bit plane n. At step 912 the significance of R is coded by outputting a 1 if R is significant or outputting a 0 if R is insignificant. Processing then resumes at step 920. If decision block 912 returns a no, then processing skips immediately to step 920.

In decision block 920 a check is made to determine if R is significant at bit plane n, if decision block 920 returns no, processing continues at step 950.

If decision block 920 returns a yes, processing continues at step 925. At step 925, R is removed from the LIR. In step 930 a 2×2 significance mask is coded with a 15 level Huffman code. This step is further explained after step 940 is described. Decision block 935 checks if R is a region consisting of 2×2 coefficients. If decision block 935 returns a no, then processing continues at step 940. At step 940 R is partitioned into 4 regions, namely its four quadrants, and these are added to the end of the LIR. For example, if block 800 in FIG. 8 is the region R, then 810, 820, 830 and 840 are the four quadrants. The significance mask, coded in step 930, is a 2×2 binary mask indicating the significance (with respect to n) of each of the 2×2 quadrants in R. If, for example, 810, 820, and 840 are insignificant with respect to n, while 830 is significant with respect to n, then the significance mask would be, $$\begin{bmatrix} 0 & 0 \\ 1 & 0 \end{bmatrix}$$

where 0 indicates insignificant, and 1 significant. Note that there are only 15 possible different significance masks as one quadrant must be significant.

Note that at step 940 the significance of each of the 4 regions that are added to the end of the LIR has already been coded at step 930, via the significance mask. This is why at step 912 a check is made if region_num is less than or equal to L. If region_num is greater than L, then the significance of the region has already been coded at step 930 during the coding of some previous region (whose index is less than region_num).

Returning to decision block 935, if said block returns a yes, then processing continues at step 945. If R is a 2×2 block of coefficients then the significance mask indicates the significance of each of the 2×2 coefficients. To continue with the example, in the case where R is a 2×2 region, 810, 820, 830 and 840 are 1×1 regions (namely individual coefficients). At step 945, if a coefficient in the 2×2 region R is significant, it is added to the list of significant coefficients and a sign bit is output. That is, a 0 output if the coefficient is positive or a 1 is output if the coefficient is negative. At step 945, if a coefficient in the 2×2 region R is insignificant, it is added to the list of insignificant coefficients. After steps 940 and 945 processing resumes at step 950.

In decision block 950 a check is made to determine if R is the last region in the LIR. If decision block 950 returns a yes then processing terminates at step 960. If decision block 950 returns a no, processing resumes at step 955. At step 955 the current region index, region_num, is incremented, and R is set to the next region in the LIR. Processing then resumes at step 912.

Encoding the LIC List

Figure 10:
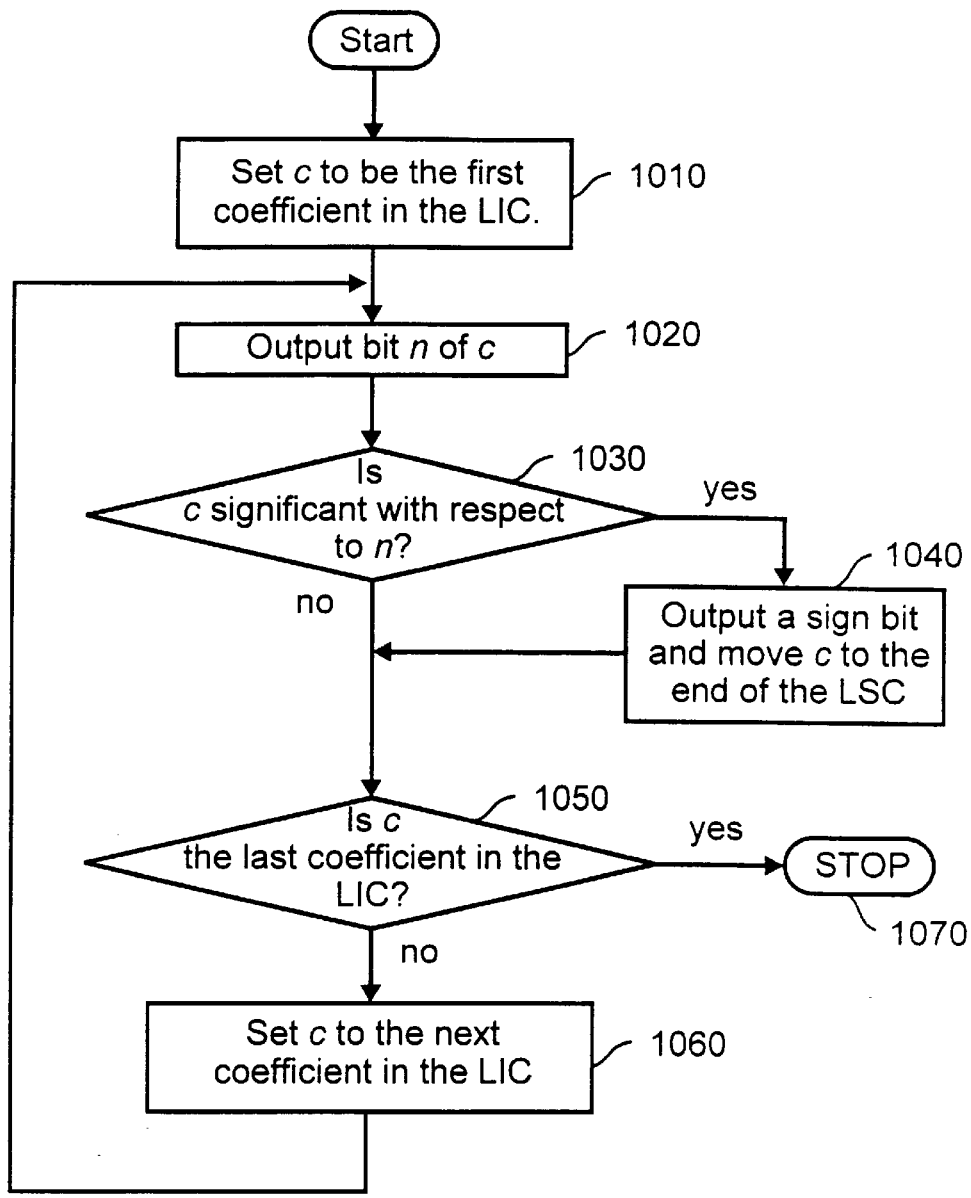
FIG. 10 is a flow diagram of the LIC encoding process as used in step 740 of FIG. 7.

Referring to FIG. 10, the list of insignificant coefficients LIC are coded at bit plane n in step 740 of FIG. 7 as follows. The list of insignificant coefficients is simply a list of coefficients added by the LIR coding process. In step 1010 the current coefficient c is set to the first coefficient in the LIC. In step 1020 bit n of c is output. That is a 1 is output if bit n of c is a 1, else 0 is output. In decision block 1030 a check is made to determine if c is significant at bit plane n. If decision block 1030 returns a yes (that is a 1 was output at step 1020) processing continues at step 1040. At step 1040, a sign bit is output and the coefficient c is removed from the LIC and added to the end of the LSC. Processing then continues at step 1050. If decision block 1030 returns a no, processing resumes at step 1050. At decision block 1050 a check is made to determine if c is the last coefficient in the LIC. If decision block 1050 returns a no, processing terminates at step 1070. If decision block 1050 returns a yes then processing continues at step 1060. At step 1060 the current coefficient c is set to the next coefficient in the LIC. Processing then continues at step 1020.

Encoding the LSC List

Figure 11:
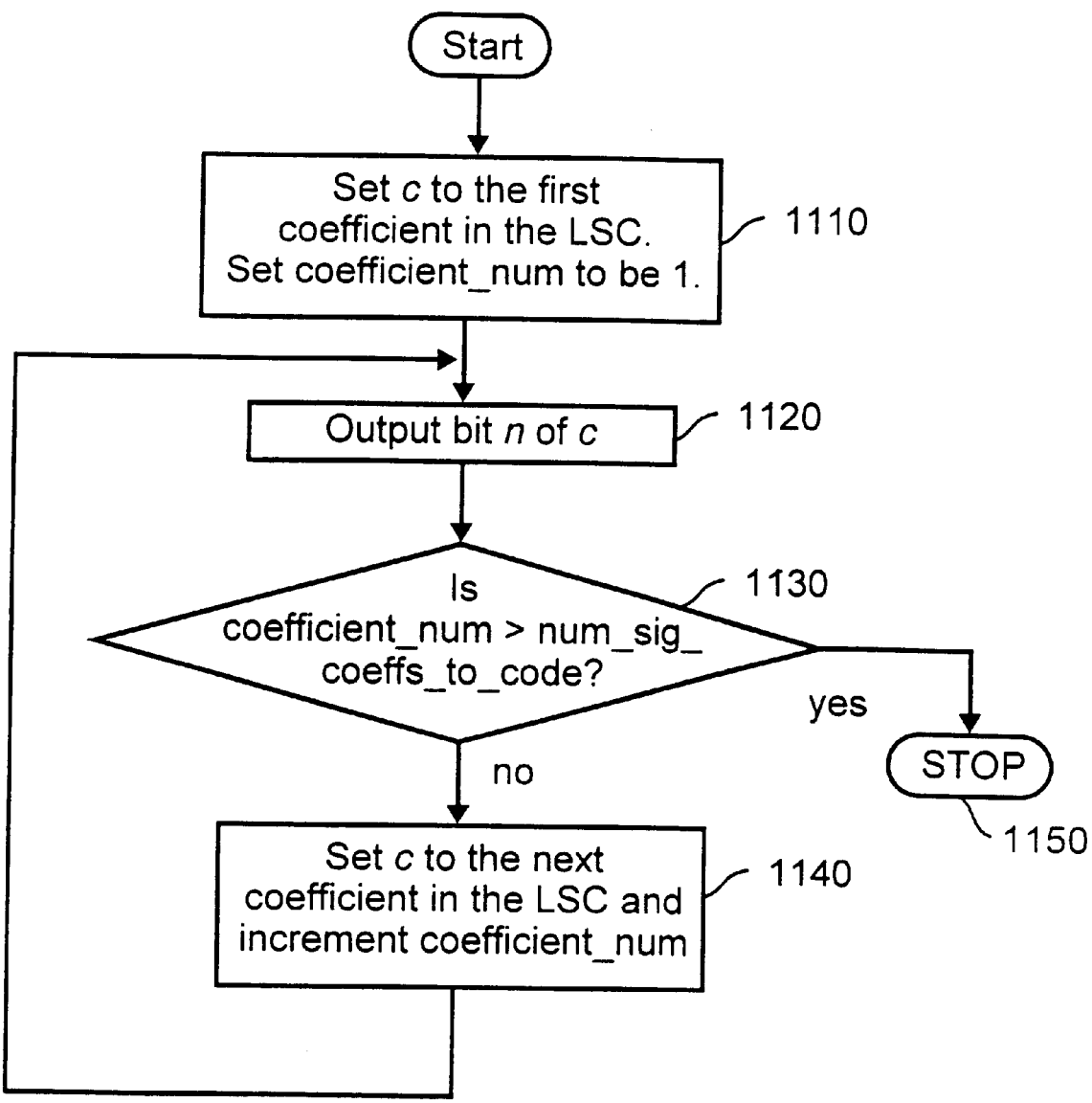
FIG. 11 is a flow diagram of the LSC encoding process as used in step 775 of FIG. 7.

Referring to FIG. 11, the list of significant coefficients LSC are coded at bit plane n in step 775 of FIG. 7 as follows. The list of significant coefficients are simply those coefficients added by the LIR and LIC coding processes. At step 1110 the current coefficient c is set to the first coefficient in the LSC and the current coefficient index, coefficient_num, is set to 1. At step 1120 bit n of c is output. That is a 1 is output if bit n of c is a 1, else a 0 is output. At decision block 1130, a check is made to determine if coefficient_num is greater than or equal to num_sig_coeffs_to_code. The variable num_sig_coeffs_to_code is set in steps 730 and 777 and is used so that those coefficients that are added to the LSC at steps 740 and 760 for bit plane n are not coded again during the coding of the LSC at bit plane n. If decision block 1130 returns a yes, processing terminates at step 1150. If decision block 1130 returns a no, processing continues at step 1140. At step 1140 the current coefficient c is set to the next coefficient in the LSC and the current coefficient index, coefficient_num, is incremented. Processing then continues at step 1120.

Embedded Quadtree Decoding

Given an embedded quadtree code for a block the block can be reconstructed, up to a precision determined by the last pass in the encoder, using the reverse of the quadtree encoding procedure. The decoder follows essentially the same algorithm. The direction of the branching or decision points in the algorithm are now determined from the bits in the coded bit stream, that were output by the encoder at the corresponding points.

At the termination of any pass (LIC, LIR of LSC) the decoder can determine each coefficient in the block up to a certain bit precision. For example if the last pass was the LSC at bit plane n=3, bit 3 and above can be determined for each coefficient in the block by the decoder, and we say that each decoded coefficient has a bit precision of 3. Preferably the decoder reconstructs each coefficient in the middle of the decoded coefficient's uncertainty interval. That is suppose a decoded coefficient has a bit precision of n and the (decoded or actual) coefficient has a non-zero bit in bit plane n or higher. Let m be the magnitude of a number with zeros in bit planes 0 to n−1, and bits in higher bit planes according to the decoded bits for the coefficient. Then, preferably, the magnitude of the decoded coefficient is given by $m+2^{n-1}$. This reflects the fact that as far as the decoder can currently ascertain, the original coefficient can have a magnitude between m and $m+2^n$. The interval $[m, m+2^n)$ is called the uncertainty interval. For a bit precision of n if the coefficient has no non-zero bits in bit plane n or higher the decoded value is 0.

Calculating the Distortion

Referring to FIG. 7, image distortion is calculated and retained at steps 745, 765, and 776. In the preferred embodiment, image distortion is calculated using a simplified perceptual model based on the wavelet coefficients in the current block and blocks at the same level, but at different orientations. This improves the reliability of the model and makes the perceptual distortion metric suitable for a constrained memory implementation where coefficients at other levels of decomposition may not (yet) be available.

Figure 13:
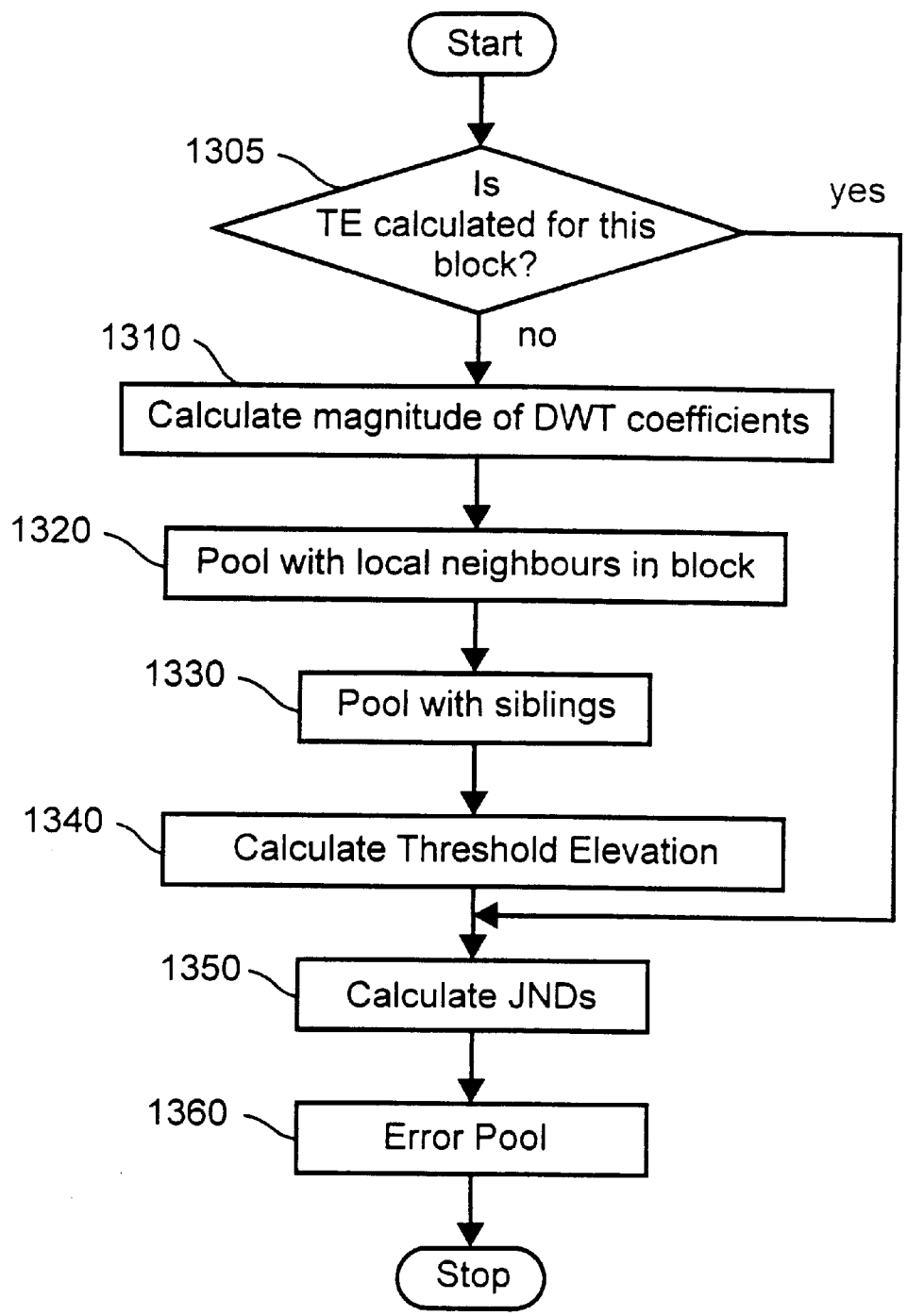
FIG. 13 is a flow diagram of the process for determining the current rate and distortion as used in steps 745, 765 and 776 of FIG. 7.

Referring to FIG. 13, decision block 1305 checks if the threshold elevation (TE) has been calculated for the current block of DWT coefficients. If decision block 1305 returns a yes, processing continues at step 1350. If decision block 1305 returns a no, TE is calculated for the current block of DWT coefficients in steps 1310, 1320, 1330, and 1340 as follows. The threshold elevation is calculated on the original DWT coefficients, prior to their encoding by the quadtree embedded coding process. At step 1310, the magnitudes (absolute value) of the DWT coefficients of the current block are calculated. These magnitudes are then pooled with their neighbouring (magnitude) coefficients, to calculate the local spatial masking effect, in step 1320. Preferably, the pooling function applied to each coefficient is a weighted sum of its eight nearest neighbours with weighting matrix, $$\frac{1}{16}\begin{bmatrix} 1 & 2 & 1 \\ 2 & 4 & 2 \\ 1 & 2 & 1 \end{bmatrix},$$

where the largest weight (4/16) is applied to the coefficient for which the threshold elevation (TE) is being calculated. Processing then continues at step 1330 where the pooled coefficients are further pooled with their corresponding sibling coefficients, i.e, coefficients relating to the same spatial location, at the same DWT level, but in different orientation subbands. Preferably the pooling function used is as follows,

| Subband/weight | LH | HL | HH |
|---|---|---|---|
| LH | 0.6 | 0.15 | 0.25 |
| HL | 0.15 | 0.6 | 0.25 |
| HH | 0.25 | 0.25 | 0.5 |

For example, a coefficient A in subband LH is pooled to determine new coefficient A' as follows A'=0.6A+0.15C+0.25B, where C is the coefficient at the same spatial location as A but from subband HL and B is the coefficient at the same spatial location as A but from subband HH. Again, the weighting for each sibling is applied to the magnitude of the coefficients. Note that preferably the subband weights are constrained to sum to one along both the rows and columns so that, on average, each subband has an equal effect on the masking process.

At step 1340 the threshold elevation (TE) is calculated as follows, $$TE = \min(m, \max(t, b \cdot \text{pool}(|c|))). \tag{4}$$

Figure 14:
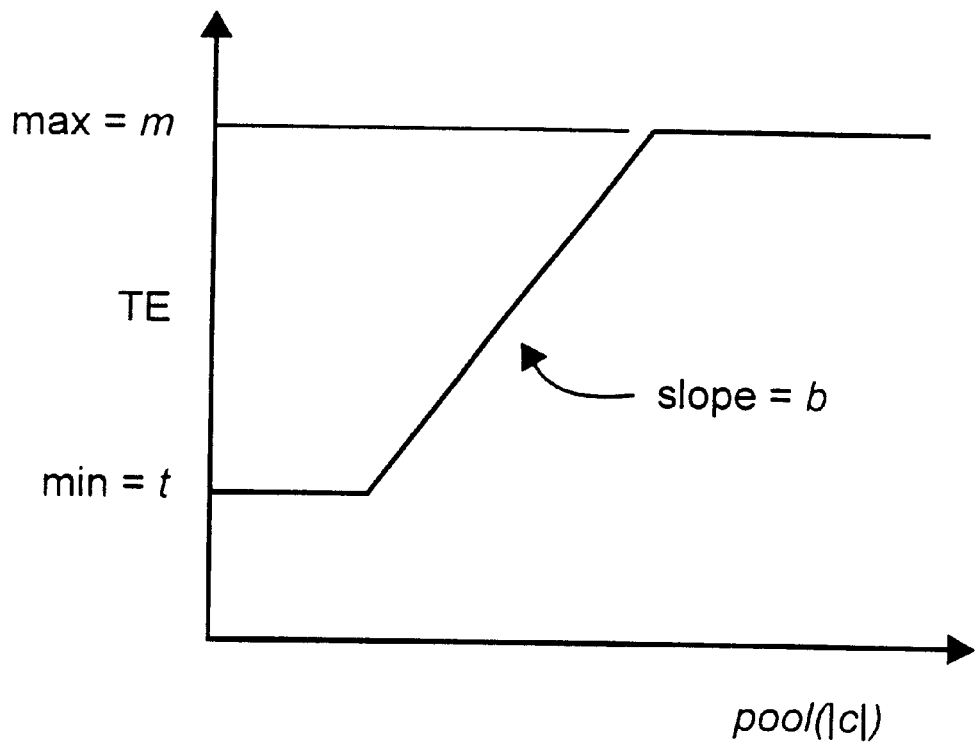
FIG. 14 shows a threshold elevation function.

This function is shown in FIG. 14. Here pool is a function that applies both steps 1320 and 1330, m is the maximum threshold (preferably m=200), b is the scaling factor, or slope, of the masking function, and t is the minimum masking level. In the preferred embodiment we use a value of b=1 in the first three levels of the DWT and a value of b=0.7 at the fourth (or higher) level. Modelling the threshold elevation function as linear function with unit slope is consistent with known results on phase incoherent (noise) masking, while the slope of 0.7 is consistent with phase coherent (sinusoidal) masking. The minimum threshold level, t, is the minimum threshold elevation which is solely dependent on the block's level in the DWT decomposition and its orientation, e.g., vertical (the LH subbands), horizontal (the HL subbands) or diagonal (the HH subbands). It is defined by the contrast threshold function (CTF) of the DWT basis, i.e., the minimum detectable contrast of a basis function from each subband of the DWT. The CTF can be measured for any DWT basis function using a psychophysical trial. For example, the technical paper of A. Watson et al, "Visibility of Wavelet Quantisation Noise," published in IEEE transactions on Image Processing, Vol 6, No. 8, Pages 1164–1175. 1997, describes how to measure the contrast threshold function for the linear phase 9/7 bi-orthogonal wavelets. In the preferred embodiment we also use the bi-orthogonal 9/7 wavelets and calculate the minimum threshold as follows, $$t = \frac{10^{\log(0.495)+0.466(\log(w)-\log(0.401g)}}{p_1 \cdot p_2 \cdot p_L^{2(l-1)}}, \quad (5)$$

where $w=f(l,r,v)$ is the minimum spatial frequency of the wavelet subband determined from, l, the DWT subband level, r the display resolution and v the viewing distance, g is a parameter equal to 1.501, 1, and 0.534 for the LL, LH/HL, and HH subbands respectively, and $p_L$ is the maximum coefficient amplitude for the low-pass synthesis filter ($p_L \approx 0.788485$). The parameters $p_1$ and $p_2$ are both $p_L$ for the LL subband, both $p_H$ for HH subbands, and $p_L$, $p_H$ for the LH and HL subbands ($p_H$ is the maximum coefficient amplitude of the high-pass synthesis filter ($p_H \approx 0.852699$)).

After TE has been calculated for each coefficient in the current block of DWT coefficients, processing resumes at step 1360 where the number of just-noticeable-differences (JNDs) are calculated for every coefficient in the block. This is done by dividing the difference between the original DWT coefficients, c, and their de-quantised values, $c_d$, by the threshold elevation (TE) calculated at steps 1310 though 1340, $$JND = \frac{|c - c_d|}{TE}. \quad (6)$$

Therefore, we have defined one JND to be the point where the reconstruction error ($|c-c_d|$) equals the threshold elevation (TE). Note that the de-quantised DWT coefficients, $c_d$, are those that would be reconstructed at the decoder (utilising any decoder rounding as appropriate).

The final step in calculating the distortion of the block is step 1350 and this pools the errors in the block using a Minkowski sum, $$d = \frac{1}{N}\left\{\sum_n |JND|^\beta\right\}^{\frac{1}{\beta}}. \quad (7)$$

In the preferred embodiment we use a value of $\beta=\infty$, which is effectively calculating the maximum JND value in the block (without the factor 1/N). Other values of $\beta$ can also be used, with values of $\beta=4$ and $\beta=2$ being known to perform well in certain situations.

Rate Distortion Optimisation

Step 450 of FIG. 4 is now described in more detail. In steps 745 765 and 776 of FIG. 7, the current block rate and distortion are calculated and retained, giving a rate distortion point for each of said steps for each coded bit plane. Thus a rate distortion point is determined for each bitplane, i.e. for each LIC, LIR, and LSC pass. The rate distortion points are ordered according to the order in which they were calculated in, i.e., by increasing rate.

For block n, let the ordered finite number of rate points be denoted by $r_1^n, r_2^n, \ldots, r_N^n$ and associated distortion points by $d_1^n, d_2^n, \ldots, d_N^n$. By terminating block n at the code point where the rate is $r_{i_n}^n$, the total rate for the coded image (viz for all blocks) is given by, $$R_{total} = \frac{1}{N_p}\sum_n r_{i_n}^n \quad (8)$$

where $N_p$ is the number of pixels in the image. The preferred method minimises the total distortion, $$D_{total} = \frac{1}{N_b}\sum_n d_{i_n}^n \quad (9)$$

where there are $N_b$ blocks, for a given desired total rate $R_{desired}$. That is to find, $$\min_{i_n} D_{total} \text{ such that } R_{total} \leq R_{desired} \quad (10)$$

This is achieved using the method of Lagrange multipliers. That is if there is a $\lambda \geq 0$ such that if $n_i$ solve, $$\min_{i_n} D_{total} + \lambda R_{total} \quad (11)$$

and the corresponding $R_{total}=R_{desired}$ then these $n_i$ also solve the constrained problem of (9). In practice we settle for a rate $R_{total} \approx R_{desired}$ where $R_{total} < R_{desired}$ as the exact constraint may not be met by any $\lambda$.

Figure 12:
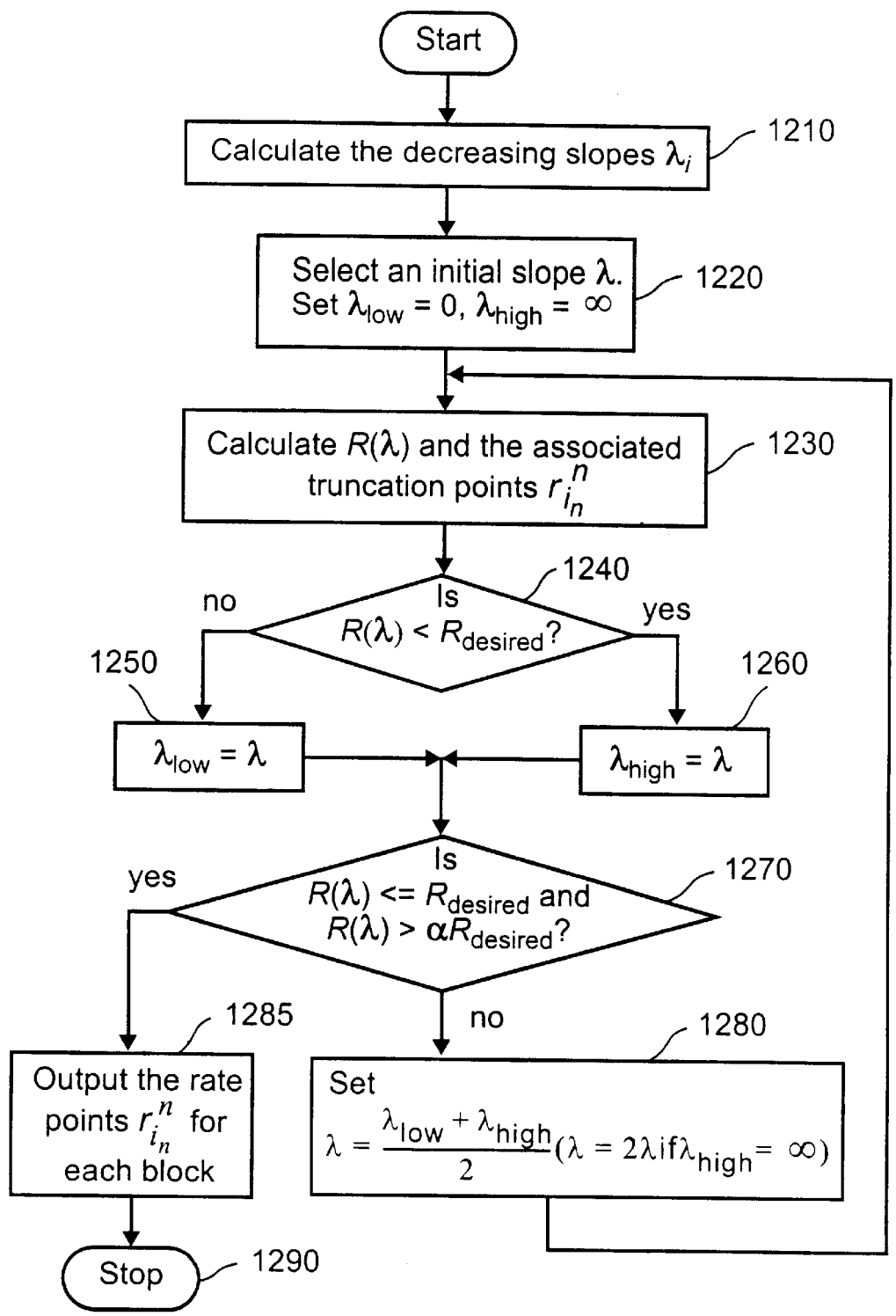
FIG. 12 is a flow diagram of the process for determining the optimum perceptual truncation point as used in step 450 of FIG. 4.

The procedure for solving (10) via (11) is described with reference to FIG. 12 as follows. At step 1210 for each block the slope corresponding to each rate distortion point is calculated. For block n the set of slopes, $\lambda_1^n, \lambda_2^n, \ldots, \lambda_{N+1}^n$, is given by, $$\lambda_i^n = \begin{cases} \infty & i = 1 \\ \frac{d_{i-1}^n - d_i^n}{r_i^n - r_{i-1}^n} & i = 1, \ldots, N \\ 0 & i = N+1 \end{cases} \quad (12)$$

The slopes are assumed to be decreasing: that is $\lambda_1^n \geq \lambda_2^n \geq \ldots \geq \lambda_{N+1}^n$ for each block n. If $\lambda_i^n < \lambda_{i+1}^n$ then the rate distortion point ($r_i^n$, $d_i^n$) is removed from the set of possible rate distortion points for block n. The remaining rate distortion points are then relabelled and the slopes recalculated. This procedure continues until the slopes are decreasing. Assuming that at the end of this procedure there are M rate distortion points, where $M \leq N$, we then have $\lambda_1^n \geq \lambda_2^n \geq \ldots \geq \lambda_{M+1}^n$.

At step 1220 an initial slope $\lambda$ is selected, and $\lambda_{low}$ and $\lambda_{high}$ are set to 0 and $\infty$ respectively. Preferably a slope of $\lambda=10$ is selected as an initial slope. At step 1230 the optimum total rate associated with $\lambda$, $R(\lambda)$ is calculated, and the associated optimum termination points $r_{i_n}{}^n$ for each block n. These termination points are the solution to the Lagrangian minimisation problem in (11). This step is described below. At decision block 1240 a check is made to determine if $R(\lambda)<R_{desired}$. If decision block 1240 returns a no, processing continues at step 1250. At step 1250 $\lambda_{low}$ is set to $\lambda$. Processing then resumes at step 1270. If decision block 1240 returns a yes, then processing continues at step 1260. At step 1260 $\lambda_{high}$ is set to $\lambda$. Processing then resumes at step 1270.

At decision block 1270 a check is made to determine if $R(\lambda)<R_{desired}$ and $R(\lambda)>\alpha R_{desired}$, where $\alpha$ is some rate tolerance less than 1. Preferably $\alpha=0.99$ is used. Although it is not shown in FIG. 12 an iteration count is kept, and if this count is exceeded then decision block 1270 returns a yes. If decision block 1270 returns a yes then processing continues at step 1285. At step 1285, the optimum rate points for each block $r_{i_n}{}^n$ are output. Processing then terminates in step 1290. If decision block 1270 returns a no, then processing continues at step 1280. At step 1280 the current slope $\lambda$ is updated and processing resumes at step 1230.

The optimum total rate and associated termination points are calculated in step 1230 as follows. For block n the optimum termination point for an operating slope of $\lambda$ is $r_{i_n}{}^n(\lambda)$ where, $$\lambda_{i_n+1}{}^n \leq \lambda \leq \lambda_{1_n}{}^n \quad (13)$$

The total optimum rate is then given by, $$R(\lambda) = \sum_n r_{i_n}^n(\lambda) \quad (14)$$

In the case where there is more than one $i_n$ that satisfies (13) we keep a record of the each possible $n_i$. Correspondingly there is then a set of different possible total optimum rates $\{R(\lambda)\}$ and within this finite set there is a minimum $R_{min}(\lambda)$ and a maximum $R_{max}(\lambda)$. If at decision block 1270 $R_{min}(\lambda)<R_{desired}$ and $R_{max}(\lambda)>R_{desired}$, then decision block 1270 returns a yes, and the set of termination points $r_{i_n}{}^n(\lambda)$ corresponding to the largest $R(\lambda)$ that is less than or equal to $R_{desired}$ is output at step 1285.

In a further preferred embodiment, the total rate is minimized for a given total distortion rate. This is achieved in a similar manner as described above.

Forming the Compressed Bit Stream

In step 460 of FIG. 4, the truncated codes for each block are concatenated into a bit stream. A special code is needed to delineate the termination point for each block. Preferably, the code for a block is followed by a byte aligned 0xFF 8-bit binary code, to indicate termination of the code for the current block. That is at the end of a block code, a number of zero bits are output to make up a full byte. Then an 0xFF 8-bit binary code is output. Using such a termination code requires that no byte aligned 0xFF code is output by the encoder at any other time. This is ensured by inserting a 0 into the bit stream if ever a byte aligned 0xFF or 0xFE is to be output, just before the last bit in this byte.

Preferred Embodiment of Apparatus(s)

Figure 15:
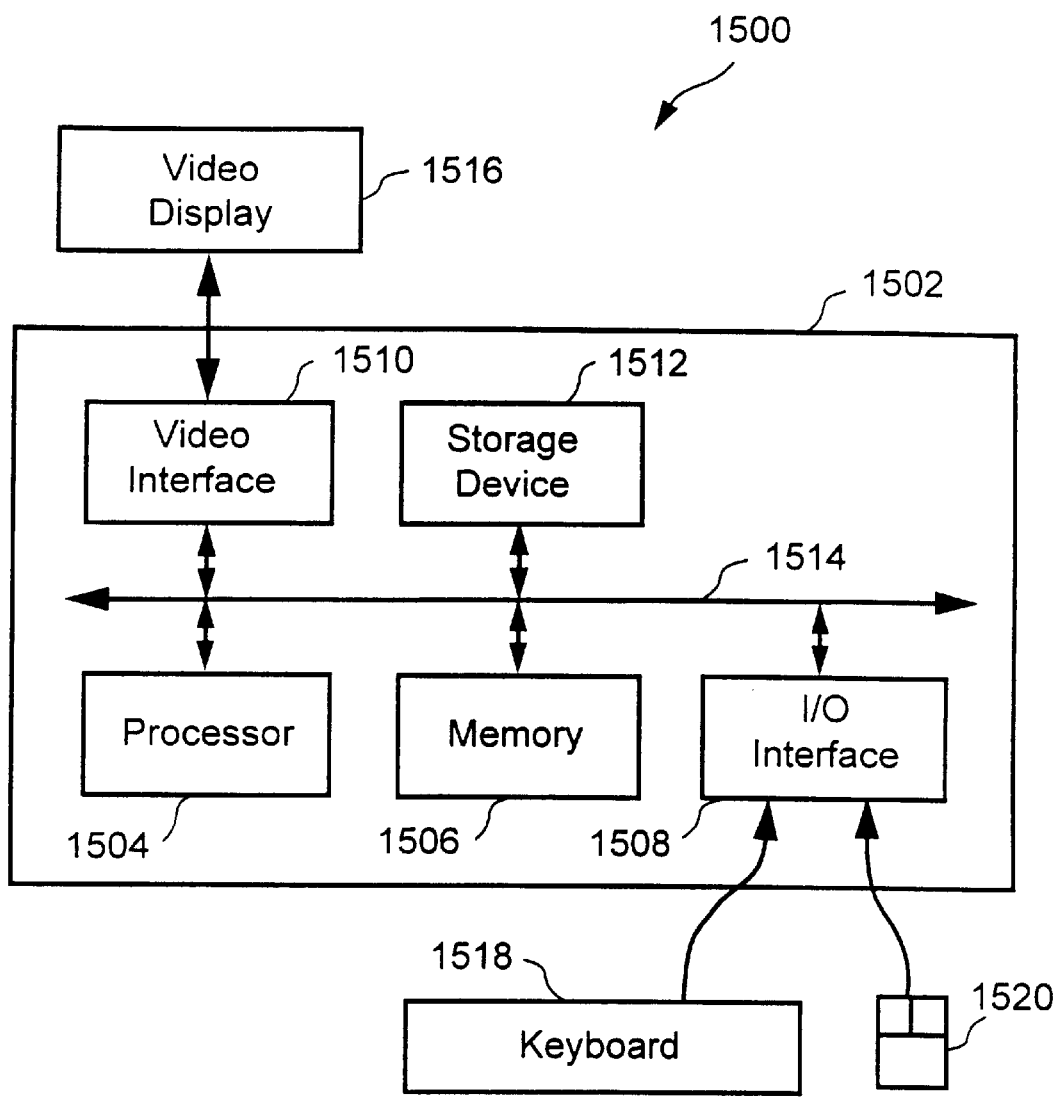
FIG. 15 shows a general purpose computer for implementating the preferred methods.

The encoding processes of the proposed method are preferably practiced using a conventional general-purpose computer, such as the one shown in FIG. 15, wherein the processes may be implemented as software executing on the computer. In particular, the steps of the coding methods are effected by instructions in the software that are carried out by the computer. The software may be divided into two separate parts; one part for carrying out the encoding methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding digital images in accordance with the embodiments of the invention.

The computer system 1500 consists of the computer 1502, a video display 1516, and input devices 1518, 1520. In addition, the computer system 1500 can have any of a number of other output devices including line printers, laser printers, plotters, and other reproduction devices connected to the computer 1502. The computer system 1500 can be connected to one or more other computers via a communication interface 1508c using an appropriate communication channel 1530 such as a modem communications path, a computer network, or the like. The computer network may include a local area network (LAN), a wide area network (WAN), an Intranet, and/or the Internet.

The computer 1502 itself consists of a central processing unit(s) (simply referred to as a processor hereinafter) 1504, a memory 1506 which may include random access memory (RAM) and read-only memory (ROM), input/output (I/O) interfaces 1508a. 1508b & 1508c, a video interface 1510, and one or more storage devices generally represented by a block 1512 in FIG. 15. The storage device(s) 1512 can include one or more of the following: a floppy disc, a hard disc drive, a magneto-optical disc drive, CD-ROM, magnetic tape or any other of a number of non-volatile storage devices well known to those skilled in the art. Each of the components 1504 to 1512 is typically connected to one or more of the other devices via a bus 1514 that in turn can include data, address, and control buses.

The video interface 1510 is connected to the video display 1516 and provides video signals from the computer 1502 for display on the video display 1516. User input to operate the computer 1502 can be provided by one or more input devices 1508b. For example, an operator can use the keyboard 1518 and/or a pointing device such as the mouse 1520 to provide input to the computer 1502.

The system 1500 is simply provided for illustrative purposes and other configurations can be employed without departing from the scope and spirit of the invention. Exemplary computers on which the embodiment can be practiced include IBM-PC/ATs or compatibles, one of the Macintosh (™) family of PCs, Sun Sparcstation (™), or the like. The foregoing are merely exemplary of the types of computers with which the embodiments of the invention may be practiced. Typically, the processes of the embodiments, described hereinafter, are resident as software or a program recorded on a hard disk drive (generally depicted as block 1512 in FIG. 15) as the computer readable medium, and read and controlled using the processor 1504. Intermediate storage of the program and pixel data and any data fetched from the network may be accomplished using the semiconductor memory 1506, possibly in concert with the hard disk drive 1512.

In some instances, the program may be supplied to the user encoded on a CD-ROM or a floppy disk (both generally depicted by block 1512), or alternatively could be read by the user from the network via a modem device connected to the computer, for example. Still further, the software can also be loaded into the computer system 1500 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The preferred method of encoding may alternatively be implemented in dedicated hardware such as one or more integrated circuits performing the functions or sub functions of the steps of the method. Such dedicated hardware may include graphic processors, digital signal processors, or one or more microprocessors and associated memories.

Variations on the Preferred Embodiment

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. In particular, the visual model used to calculate the perceptual distortion can be implemented with a number of mathematical functions that have, broadly speaking, the same functionality. For example, non-linear functions, such as the square-root, of DWT coefficients can be used to model the threshold elevation function. Also, the JNDs calculated for each block can be converted to detection probabilities using an 'S' shaped, psychometric, function, such as, $$P = 1 - e^{-\left|\frac{c-c_d}{\alpha TE}\right|^\beta},$$

where $\alpha$ is the decision threshold (normally 1.0) and $\beta$ is the slope of the function (normally 2.0). These detection probabilities can then be pooled as with the JNDs in the preferred embodiment. Detection probabilities or YNDs can then be pooled over frequency and/or scale to determine the perceptual block distortion. Techniques known in the prior art such as a product series or Minkowski sum can be utilised to do this.

The foregoing only describes a small number of embodiments of the present invention, however, modifications and/or changes can be made thereto by a person skilled in the art without departing from the scope and spirit of the invention. The present embodiments are, therefore, to be considered in all respects to be illustrative and not restrictive.

We claim:

1. A method of representing a digital image to provide a coded representation, said method comprising the steps of:
    (i) transforming the digital image to derive a plurality of blocks of coefficients;
    (ii) embedded quadtree bitplane encoding, in one or more passes per bitplane, each block of coefficients;
    (iii) determining a block rate for each encoded pass of each block;
    (iv) determining a distortion measure for each encoded pass of each block;
    (v) terminating each encoded block at an encoded pass that minimizes image distortion based on the distortion measures for a predetermined total of the block rates; and
    (vi) concatenating the terminated encoded blocks to form the coded representation.

2. A method as claimed in claim 1, wherein said terminating step comprises the sub-steps of:
    (v)(a) determining termination points of each encoded block that minimize image distortion based on the distortion measures for the predetermined total of block rates by utilizing Lagrange multipliers; and
    (v)(b) terminating each encoded block at the determined termination point.

3. A method as claimed in claim 1, wherein said block rate determining step and said distortion measure determining step are sub-steps of said embedded quadtree bitplane encoding step and are performed during said embedded quadtree bitplane encoding step.

4. A method as claimed in claim 3, wherein said embedded quadtree bitplane encoding step, said block rate determining sub-step, and said distortion measure determining sub-step comprise the following sub-steps, which are performed for each bitplane of each block:
    (a) a first coding pass sub-step, of coding a first part of the bitplane;
    (b) determining a first block rate associated with the first part of the bitplane;
    (c) determining a first distortion measure associated with the first part of the bitplane;
    (d) a second coding pass sub-step, of coding a second part of the bitplane;
    (e) determining a second block rate associated with the second part of the bitplane;
    (f) determining a second distortion measure associated with the second part of the bitplane;
    (g) a third coding pass sub-step, of coding a third part of the bitplane;
    (h) determining a third block rate associated with the third part of the bitplane; and
    (i) determining a third distortion measure associated with the third part of the bitplane.

5. A method as claimed in claim 1, wherein the blocks are sub-bands of discrete wavelet transform coefficients.

6. A method as claimed in claim 1, wherein the blocks are sub-blocks of sub-bands of discrete wavelet transform coefficients.

7. A method as claimed in claim 1, wherein the embedded quadtree bitplane encoding step encodes the bitplanes of each block to a minimum bitplane, where the minimum bitplane of a block is the largest bitplane where the block visual distortion is zero.

8. A method as claimed in claim 1, further comprising the step of terminating the encoded blocks with a special code.

9. A method of representing a digital image to provide a coded representation, said method comprising the steps of:
    (i) transforming the digital image to derive a plurality of blocks of coefficients;
    (ii) embedded quadtree bitplane encoding, in one or more passes per bitplane, each block of coefficients;
    (iii) determining a block rate for each encoded pass of each block;
    (iv) determining a distortion measure for each encoded pass of each block;

(v) terminating each encoded block at an encoded pass that minimizes a total block rate based on the block rates for a predetermined image distortion; and (vi) concatenating the terminated encoded blocks to form the coded representation.

10. A method as claimed in claim 9, wherein said terminating step comprises the sub-steps of:

(v)(a) determining termination points of each encoded block that minimize the total block rate based on the block rates for the predetermined image distortion by utilizing Lagrange multipliers; and (v)(b) terminating each encoded block at the determined termination point.

11. A method of representing a digital image to provide a coded representation, said method comprising the steps of:

(i) transforming the digital image to derive a plurality of blocks of original coefficients, wherein each block has a corresponding maximum bitplane and a corresponding minimum bitplane;

(ii) embedded quadtree bitplane encoding, in one or more passes per bitplane, each block of coefficients from the corresponding maximum bitplane to the corresponding minimum bit plane;

(iii) determining a block rate for each encoded pass of each bitplane of each block, wherein the block rate for a designated encoded pass of a designated bitplane of a designated block is representative of the number of code bits coded during said embedded quadtree bitplane encoding step of the designated block from its corresponding maximum bitplane to a respective at least one part of the designated bitplane;

(iv) determining a distortion measure for each encoded pass of each bitplane of each block, wherein the distortion measure for a designated encoded pass of a designated bitplane of a designated block is a function of the coefficients decoded from the encoded passes from the maximum bitplane corresponding to said designated block to a respective at least one part of the designated bitplane and is a function of the original coefficients of the designated block;

(v) terminating each encoded block at an encoded pass that minimizes image distortion based on the distortion measures for a predetermined total of block rates; and (vi) concatenating the terminated encoded blocks to form the coded representation.

12. A method as claimed in claim 11, wherein said terminating step comprises the sub-steps of:

(v)(a) determining termination points of each encoded block that minimize image distortion based on the distortion measures for the predetermined total of block rates by utilizing lagrange multipliers; and (v)(b) terminating each encoded block at the determined termination point.

13. A method as claimed in claim 11, wherein said determining step iv comprises the sub-steps of:

(iv)(a) generating, for each original coefficient of each block, a weighted sum of magnitudes of neighboring coefficients;

(iv)(b) calculating a threshold elevation, for each original coefficient of said block, based on the weighted sum;

(iv)(c) calculating a distortion value for each encoded coefficient for each encoded pass of each bitplane of each block, wherein said distortion value for a designated encoded coefficient for a designated encoded pass of a designated bitplane of a designated block is based on the threshold elevation function for the original coefficient corresponding to the designated encoded coefficient, a value of the original coefficient corresponding to the designated encoded coefficient, and a value of the designated encoded coefficient as decoded from the encoded passes of the bitplanes from the maximum bitplane corresponding to the designated block to respective at least one part of the designated bitplane; and (iv)(d) pooling the distortion values for each encoded coefficient to derive the distortion measure for each encoded pass of each block.

14. A method as claimed in claim 11, wherein said block rate determining step and said distortion measure determining step are sub-steps of said embedded quadtree bitplane encoding step and are performed during said embedded quadtree bitplane encoding step.

15. A method as claimed in claim 14, wherein said embedded quadtree bitplane encoding step, said block rate determining sub-step, and said distortion measure determining sub-step comprise the following sub-steps, which are performed for each bitplane of each block:

(a) a first coding pass, for coding a first part of the bitplane;

(b) determining a first block rate associated with the first part of the bitplane;

(c) determining a first distortion measure associated with the first part of the bitplane;

(d) a second coding pass, for coding a second part of the bitplane;

(e) determining a second block rate associated with the second part of the bitplane;

(f) determining a second said distortion measure associated with the second part of the bitplane;

(g) a third coding pass, for coding a third part of the bitplane;

(h) determining a third block rate associated with the third part of the bitplane; and (i) determining a third distortion measure associated with the third part of the bitplane.

16. A method as claimed in claim 15, wherein said first coding pass comprises:

(a)(1) coding the significance of each coefficient in any one or more sub-regions of the bitplane, if the sub-region is of a predetermined minimum size and comprises coefficients having corresponding most significant bits in the bitplane or less.

17. A method as claimed in claim 15, wherein said second coding pass comprises:

(d)(1) coding the significance of a sub-region of a bitplane of the block of transform coefficients, if the sub-region comprises a number of coefficients having corresponding most significant bits in the bitplane or less;

(d)(2) partitioning one sub-region into further sub-regions if the sub-region prior to partitioning is significant and is greater than the predetermined minimum size; and (d)(3) repeating steps (d)(1) and (d)(2) for each remaining subregion.

18. A method as claimed in claim 15, wherein said third coding pass comprises:

(g)(1) coding a corresponding bit of each coefficient in any one or more sub-regions of the bitplane, if the sub-regions comprise coefficients having corresponding most significant bits in a bitplane greater than the bitplane.

19. A method as claimed in claim 11, wherein said transforming step comprises discrete wavelet transforming the image.

20. A method as claimed in claim 11, wherein the blocks are sub-bands of discrete wavelet transform coefficients.

21. A method as claimed in claim 11, wherein the blocks are sub-blocks of sub-bands of discrete wavelet transform coefficients.

22. A method as claimed in claim 13, wherein the weighted sum comprises components from corresponding neighbourhoods in sibling sub-bands.

23. A method as claimed in claim 11, wherein the minimum bitplane of a block is the largest bitplane where the block visual distortion is zero.

24. A method as claimed in claim 11, further comprising the step of terminating the encoded blocks with a special code.

25. A method as claimed in claim 11, wherein the maximum bitplane of a block is that bitplane where the most significant bit of any coefficient of the block is in the maximum bitplane or less.

26. A method of representing a digital image to provide a coded representation, said method comprising the steps of:
  (i) transforming the digital image to derive a plurality of blocks of original coefficients, wherein each block has a corresponding maximum bitplane and a corresponding minimum bitplane;
  (ii) embedded quadtree bitplane encoding, in one or more passes per bitplane, each block of coefficients from the corresponding maximum bitplane to the corresponding minimum bit plane;
  (iii) determining a block rate for each encoded pass of each bitplane of each block, wherein the block rate for a designated encoded pass of a designated bitplane of a designated block is representative of the number of code bits coded during said embedded quadtree bitplane encoding step of the designated block from its corresponding maximum bitplane to a respective at least one part of the designated bitplane;
  (iv) determining a distortion measure for each encoded pass of each bitplane of each block, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block;
  (v) terminating each encoded block at an encoded pass that minimizes a total block rate based on the block rates for a predetermined image distortion; and
  (vi) concatenating the terminated encoded blocks to form the coded representation.

27. A method as claimed in claim 26, wherein said terminating step comprises the sub-steps of:
  (v)(a) determining termination points of each encoded block that minimize the total block rate based on the block rates for the predetermined image distortion by utilizing Lagrange multipliers; and
  (v)(b) terminating each encoded block at the determined termination point.

28. Apparatus for representing a digital image to provide a coded representation, said apparatus comprising:
  means for transforming the digital image to derive a plurality of blocks of coefficients;
  means for embedded quadtree bitplane encoding, in one or more passes per bitplane, each block of coefficients;
  means for determining a block rate for each encoded pass of each block;
  means for determining a distortion measure for each encoded pass of each block;
  means for terminating each encoded block at an encoded pass that minimizes image distortion based on the distortion measures for a predetermined total of said block rates; and
  means for concatenating the terminated encoded blocks to form the coded representation.

29. Apparatus as claimed in claim 28, wherein said terminating means comprises:
  means for determining termination points of each encoded block that minimize image distortion based on the distortion measures for the predetermined total of block rates by Lagrange multipliers; and
  means for terminating each encoded block at the determined termination point.

30. Apparatus for representing a digital image to provide a coded representation, said apparatus comprising:
  means for transforming the digital image to derive a plurality of blocks of coefficients;
  means for embedded quadtree bitplane encoding, in one or more passes per bitplane, each block of coefficients;
  means for determining a block rate for each encoded pass of each block;
  means for determining a distortion measure for each encoded pass of each block;
  means for terminating each encoded block at an encoded pass that minimizes a total block rate based on the block rates for a predetermined image distortion; and
  means for concatenating the terminated encoded blocks to form the coded representation.

31. Apparatus as claimed in claim 30, wherein said terminating means comprises:
  means for determining termination points of each encoded block that minimize the total block rate based on said the block rates for the predetermined image distortion by utilizing lagrange multipliers; and
  means for terminating each encoded block at the determined termination point.

32. Apparatus for representing a digital image to provide a coded representation, said apparatus comprising:
  means for transforming the digital image to derive a plurality of blocks of original coefficients, wherein each block has a corresponding maximum bitplane and a corresponding minimum bitplane;
  means for embedded quadtree bitplane encoding, in one or more passes per bitplane, each block of coefficients from the corresponding maximum bitplane to the corresponding minimum bit plane;
  first determination means for determining a block rate for each encoded pass of each bitplane of each block, wherein the block rate for a designated encoded pass of a designated bitplane of a designated block is representative of the number of code bits coded during the embedded quadtree bitplane encoding step of the designated block from its corresponding maximum bitplane to a respective at least one part of the designated bitplane;
  second determination means for determining a distortion measure for each encoded pass of each bitplane of each block, wherein said distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block;

means for terminating each encoded block at a an encoded pass that minimizes image distortion based on the distortion measures for a predetermined total of block rates; and means for concatenating the terminated encoded blocks to form the coded representation.

33. Apparatus as claimed in claim 32, wherein said terminating means comprises:

means for determining termination points of each encoded block that minimize image distortion based on the distortion measures for the predetermined total of block rates by utilizing Lagrange multipliers; and means for terminating each encoded block at the determined termination point.

34. Apparatus as claimed in claim 32, wherein said second determination means comprises:

means for generating, for each original coefficient of each block, a weighted sum of magnitudes of neighboring coefficients;

means for calculating a threshold elevation, for each original coefficient of each block, based on the weighted sum;

means for calculating a distortion value for each encoded coefficient for each encoded pass of each bitplane of each block, wherein the distortion value for a designated encoded coefficient for a designated encoded pass of a designated bitplane of a designated block is based on the threshold elevation function for the original coefficient corresponding to the designated encoded coefficient, a value of the original coefficient corresponding to the designated encoded coefficient, and a value of the designated encoded coefficient as decoded from the encoded passes of the bitplanes from the maximum bitplane corresponding to the designated block to respective at least one part of the designated bitplane; and means for pooling the distortion values for each encoded coefficient to derive the distortion measure for each encoded pass of each block.

35. Apparatus as claimed in claim 32, wherein said embedded quadtree encoding means comprises said first and second determination means.

36. Apparatus as claimed in claim 35, wherein said embedded quadtree bitplane encoding means and said first and second determination means comprise in combination:

means for coding a first part of the bitplane in a first pass;

means for determining a first block rate associated with the first part of the bitplane;

means for determining a first distortion measure associated with the first part of the bitplane;

means for coding a second part of the bitplane in a second pass;

means for determining a second block rate associated with the second part of the bitplane;

means for determining a second distortion measure associated with the second part of the bitplane;

means for coding a third part of the bitplane in a third pass;

means for determining a third block rate associated with the third part of the bitplane; and means for determining a third distortion measure associated with the third part of the bitplane.

37. Apparatus as claimed in claim 36, wherein said first coding means comprises means for coding the significance of each coefficient in any one or more sub-regions of the bitplane, if the sub-region is of a predetermined minimum size and comprises coefficients having corresponding most significant bits in the bitplane or less.

38. Apparatus as claimed in claim 36, wherein said second coding means comprises:

first means for coding the significance of a sub-region of a bitplane of the block of transform coefficients, if the sub-region comprises a number of coefficients having corresponding most significant bits in the bitplane or less;

second means for partitioning one sub-region into further sub-regions if the sub-region prior to partitioning is significant and is greater than the predetermined minimum size; and means for repeating the operations of said first and second means for each remaining sub-region.

39. Apparatus as claimed in claim 36, wherein said third coding means comprises:

means for coding a corresponding bit of each coefficient in any one or more sub-regions of the bitplane, if the sub-regions comprise coefficients having corresponding most significant bits in a bitplane greater than the bitplane.

40. Apparatus as claimed in claim 32, wherein said transforming means comprises means for discrete wavelet transforming the image.

41. Apparatus as claimed in claim 32, wherein the blocks are sub-bands of discrete wavelet transform coefficients.

42. Apparatus as claimed in claim 32, wherein the blocks are sub-blocks of subbands of discrete wavelet transform coefficients.

43. Apparatus as claimed in claim 34, wherein the weighted sum comprises components from corresponding neighborhoods in sibling subbands.

44. Apparatus as claimed in claim 32, wherein the minimum bitplane of a block is the largest bitplane where the block visual distortion is zero.

45. Apparatus as claimed in claim 32, wherein the encoded blocks are terminated with a special code.

46. Apparatus as claimed in claim 32, wherein the maximum bitplane of a block is that bitplane where the most significant bit of any coefficient of the block is in the maximum bitplane or less.

47. Apparatus for representing a digital image to provide a coded representation, said apparatus comprising:

means for transforming the digital image to derive a plurality of blocks of original coefficients, wherein each block has a corresponding maximum bitplane and a corresponding minimum bitplane;

means for embedded quadtree bitplane encoding, in one or more passes per bitplane, each block of coefficients from the corresponding maximum bitplane to the corresponding minimum bit plane;

first determination means for determining a block rate for each encoded pass of each bitplane of each block, wherein the block rate for a designated encoded pass of a designated bitplane of a designated block is representative of the number of code bits coded during said embedded quadtree bitplane encoding step of the designated block from its corresponding maximum bitplane to a respective at least one part of the designated bitplane;

second determination means for determining a distortion measure for each encoded pass of each bitplane of each block, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block;

means for terminating each encoded block at an encoded pass that minimizes a total block rate based on the block rates for a predetermined image distortion; and means for concatenating the terminated encoded blocks to form the coded representation.

48. Apparatus as claimed in claim 47, wherein said terminating means comprises:

means for determining termination points of each encoded block that minimize the total block rate based on the block rates for said predetermined image distortion by utilizing Lagrange multipliers; and means for terminating each encoded block at the determined termination point.

49. A computer program product including a computer readable medium having recorded thereon a computer program for representing a digital image to provide a coded representation, the computer program product comprising:

means for transforming the digital image to derive a plurality of blocks of coefficients;

means for embedded quadtree bitplane encoding, in one or more passes per bitplane, each block of coefficients;

means for determining a block rate for each encoded pass of each block;

means for determining a distortion measure for each encoded pass of each block;

means for terminating each encoded block at an encoded pass that minimizes image distortion based on the distortion measures for a predetermined total of block rates; and means for concatenating the terminated encoded blocks to form the coded representation.

50. A computer program product including a computer readable medium having recorded thereon a computer program for representing a digital image to provide a coded representation, the computer program product comprising:

means for transforming the digital image to derive a plurality of blocks of coefficients;

means for embedded quadtree bitplane encoding, in one or more passes per bitplane, each block of coefficients;

means for determining a block rate for each encoded pass of each block;

means for determining a distortion measure for each encoded pass of each block;

means for terminating each encoded block at an encoded pass that minimizes a total block rate based on the block rates for a predetermined image distortion; and means for concatenating the terminated encoded blocks to form the coded representation.

51. A computer program product including a computer readable medium having recorded thereon a computer program for representing a digital image to provide a coded representation, the computer program product comprising:

means for transforming the digital image to derive a plurality of blocks of original coefficients, wherein each block has a corresponding maximum bitplane and a corresponding minimum bitplane;

means for embedded quadtree bitplane encoding, in one or more passes per bitplane, each block of coefficients from the corresponding maximum bitplane to the corresponding minimum bit plane;

first determination means for determining a block rate for each encoded pass of each bitplane of each block, wherein the block rate for a designated encoded pass of a designated bitplane of a designated block is representative of the number of code bits coded during said embedded quadtree bitplane encoding step of the designated block from its corresponding maximum bitplane to a respective at least one part of the designated bitplane;

second determination means for determining a distortion measure for each encoded pass of each bitplane of each block, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block;

means for terminating each encoded block at the encoded pass that minimizes image distortion based on the distortion measures for a predetermined total of block rates; and means for concatenating the terminated encoded blocks to form the coded representation.

52. A computer program product including a computer readable medium having recorded thereon a computer program for representing a digital image to provide a coded representation, the computer program product comprising:

means for transforming the digital image to derive a plurality of blocks of original coefficients, wherein each block has a corresponding maximum bitplane and a corresponding minimum bitplane;

means for embedded quadtree bitplane encoding, in one or more passes per bitplane, each block of coefficients from the corresponding maximum bitplane to the corresponding minimum bit plane;

first determination means for determining a block rate for each encoded pass of each bitplane of each block, wherein the block rate for a designated encoded pass of a designated bitplane of a designated block is representative of the number of code bits coded during said embedded quadtree bitplane encoding step of the designated block from its corresponding maximum bitplane to a respective at least one part of the designated bitplane;

second determination means for determining a distortion measure for each encoded pass of each bitplane of each block, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block;

means for terminating each encoded block at an encoded pass that minimizes a total block rate based on the block rates for a predetermined image distortion; and means for concatenating the terminated encoded blocks to form the coded representation.

53. A method of representing a digital image to provide a coded representation, said method comprising the steps of:

(i) transforming the digital image to derive a plurality of blocks of coefficients;

(ii) embedded quadtree bitplane-coding, in one or more passes per bitplane, each block of coefficients;

(iii) determining a block rate for each encoded pass of each block;

(iv) determining a distortion measure for each encoded pass of each block;

(v) terminating each encoded block at an encoded pass that minimizes a weighted sum of the image distortion based on the distortion measures, and the total of the block rates; and (vi) concatenating the terminated encoded blocks to form the coded representation.

54. A method of representing a digital image to provide a coded representation, said method comprising the steps of:

(i) transforming the digital image to derive a plurality of blocks of original coefficients, wherein each block has a corresponding maximum bitplane and a corresponding minimum bitplane;

(ii) embedded quadtree bitplane encoding, in one or more passes per bitplane, each block of coefficients from the corresponding maximum bitplane to the corresponding minimum bit plane;

(iii) determining a block rate for each encoded pass of each bitplane of each block, wherein the block rate for a designated encoded pass of a designated bitplane of a designated block is representative of the number of code bits coded during said embedded quadtree bitplane encoding step of the designated block from its corresponding maximum bitplane to a respective at least one part of the designated bitplane;

(iv) determining a distortion measure for each encoded pass of each bitplane of each block, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block;

(v) terminating each encoded block at an encoded pass according to a function of the determined rates and distortion values; and (vi) concatenating the terminated encoded blocks to form the coded representation.

55. A method of representing a digital image to provide a coded representation, said method comprising the steps of:

(i) transforming the digital image to derive a plurality of blocks of coefficients;

(ii) embedded bitplane encoding, in one or more passes per bitplane, each block of coefficients;

(iii) determining a rate for each encoded pass of each block;

(iv) determining a distortion measure for each encoded pass of each bitplane of each block, wherein said step of determining a distortion measure comprises the sub-steps of:

(iv)(a) generating, for each original coefficient of each block, a weighted sum of magnitudes of neighboring coefficients;

(iv)(b) calculating a threshold elevation, for each original coefficient of each block, based on the weighted sum;

(iv)(c) calculating a distortion value for each encoded coefficient for each encoded pass of each block, wherein the distortion value for a designated encoded coefficient for a designated encoded pass of a designated block is based on the threshold elevation for the original coefficient corresponding to the designated encoded coefficient, and a value of the designated encoded coefficient as decoded from the encoded passes from a maximum bitplane corresponding to the designated block to respective at least one part of the designated bitplane; and (iv)(d) pooling the distortion values for each encoded coefficients to derive the distortion measure for each encoded pass of each bitplane of each block;

(v) terminating each encoded block at an encoded pass according to a function of the determined rates and distortion values; and (vi) concatenating the terminated encoded blocks to form the coded representation.

56. A method as claimed in 55, wherein said terminating step includes terminating each encoded block at an encoded pass that minimizes image distortion based on the distortion measures for a predetermined total of rates.

57. A method as claimed in 55, wherein said terminating step includes terminating each encoded block at an encoded pass that minimizes a total rate based on the rates for a predetermined image distortion.

58. Apparatus for representing a digital image to provide a coded representation, said apparatus comprising:

means for transforming the digital image to derive a plurality of blocks of coefficients;

means for embedded quadtree bitplane-encoding, in one or more passes per bitplane, each block of coefficients;

means for determining a block rate for each encoded pass of each block;

means for determining a distortion measure for each encoded pass of each block;

means for terminating each encoded block at an encoded pass that minimizes a weighted sum of the image distortion based on the distortion measures, and the total of the block rates; and means for concatenating the terminated encoded blocks to form the coded representation.

59. Apparatus for representing a digital image to provide a coded representation, said apparatus comprising:

means for transforming the digital image to derive a plurality of blocks of original coefficients, wherein each block has a corresponding maximum bitplane and a corresponding minimum bitplane;

means for embedded quadtree bitplane encoding, in one or more passes per bitplane, each block of coefficients from the corresponding maximum bitplane to the corresponding minimum bit plane;

means for determining a block rate for each encoded pass of each bitplane of each block, wherein the block rate for a designated encoded pass of a designated bitplane of a designated block is representative of the number of code bits coded during said embedded quadtree bitplane encoding step of the designated block from its corresponding maximum bitplane to a respective least one part of the designated bitplane;

means for determining a distortion measure for each encoded pass of each bitplane of each block, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block;

means for terminating each encoded block at an encoded pass according to a function of the determined rates and distortion values; and means for concatenating the terminated encoded blocks to form the coded representation.

60. Apparatus for representing a digital image to provide a coded representation, said apparatus comprising:

means for transforming the digital image to derive a plurality of blocks of coefficients;

means for embedded bitplane encoding, in one or more passes per bitplane, each block of coefficients;

first determination means for determining a rate for each encoded pass of each block;

second determination means for determining a distortion measure for each encoded pass of each bitplane of each block, wherein said second determination means comprises:

means for generating, for each original coefficient of each block, a weighted sum of magnitudes of neighboring coefficients, means for calculating a threshold elevation, for each original coefficient of each block, based on the weighted sum, means for calculating a distortion value for each encoded coefficient for each encoded pass of each block, wherein the distortion value for a designated encoded coefficient for a designated encoded pass of a designated block is based on the threshold elevation for the original coefficient corresponding to the designated encoded coefficient, and a value of the designated encoded coefficient as decoded from the encoded passes from a maximum bitplane corresponding to the designated block to respective at least one part of the designated bitplane, and means for pooling the distortion values for each encoded coefficients to derive the distortion measure for each encoded pass of each bitplane of each block;

means for terminating each encoded block at an encoded pass according to a function of the determined rates and distortion values; and means for concatenating the terminated encoded blocks to form the coded representation.

61. Apparatus as claimed in 60, wherein said terminating means comprises means for terminating each encoded block at an encoded pass that minimizes image distortion based on the distortion measures for a predetermined total of said rates.

62. Apparatus as claimed in 60, wherein said terminating means comprises means for terminating each encoded block at an encoded pass that minimizes a total rate based on the rates for a predetermined image distortion.

63. A computer program product including a computer readable medium having recorded thereon a computer program for representing a digital image to provide a coded representation, the computer program product comprising:

means for transforming the digital image to derive a plurality of blocks of coefficients;

means for embedded quadtree bitplane-encoding, in one or more passes per bitplane, each block of coefficients;

means for determining a block rate for each encoded pass of each block;

means for determining a distortion measure for each encoded pass of each block;

means for terminating each encoded block at an encoded pass that minimizes a weighted sum of the image distortion based on the distortion measures, and the total of the block rates; and means for concatenating the terminated encoded blocks to form the coded representation.

64. A computer program product including a computer readable medium having recorded thereon a computer program for representing a digital image to provide a coded representation, the computer program product comprising:

means for transforming the digital image to derive a plurality of blocks of original coefficients, wherein each block has a corresponding maximum bitplane and a corresponding minimum bitplane;

means for embedded quadtree bitplane encoding, in one or more passes per bitplane, each block of coefficients from the corresponding maximum bitplane to the corresponding minimum bit plane;

means for determining a block rate for each encoded pass of each bitplane of each block, wherein the block rate for a designated encoded pass of a designated bitplane of a designated block is representative of the number of code bits coded during said embedded quadtree bitplane encoding step of the designated block from its corresponding maximum bitplane to a respective least one part of the designated bitplane;

means for determining a distortion measure for each encoded pass of each bitplane of each block, wherein the distortion measure for a designated encoded pass of a designated bitplane of a designated block is a function of the coefficients decoded from the encoded passes from the maximum bitplane corresponding to the designated block to a respective at least one part of the designated bitplane and is a function of the original coefficients of the designated block;

means for terminating each encoded block at an encoded pass according to a function of the determined rates and distortion values; and means for concatenating the terminated encoded blocks to form the coded representation.

65. A computer program product including a computer readable medium having recorded thereon a computer program for representing a digital image to provide a coded representation, the computer program product comprising:

means for transforming the digital image to derive a plurality of blocks of coefficients;

means for embedded bitplane encoding, in one or more passes per bitplane, each block of coefficients;

first determination means for determining a rate for each encoded pass of each block;

second determination means for determining a distortion measure for each encoded pass of each bitplane of each block, wherein the second determination means comprises:

means for generating, for each original coefficient of each block, a weighted sum of magnitudes of neighboring coefficients, means for calculating a threshold elevation, for each original coefficient of each block, based on the weighted sum, means for calculating a distortion value for each encoded coefficient for each encoded pass of each block, wherein the distortion value for a designated encoded coefficient for a designated encoded pass of a designated block is based on the threshold elevation for the original coefficient corresponding to the designated encoded coefficient, and a value of the designated encoded coefficient as decoded from the encoded passes from a maximum bitplane corresponding to the designated block to respective at least one part of the designated bitplane, and means for pooling the distortion values for each encoded coefficients to derive the distortion measure for each encoded pass of each bitplane of each block;

means for terminating each encoded block at an encoded pass according to a function of the determined rates and distortion values; and means for concatenating the terminated encoded blocks to form the coded representation.

66. A computer program product as claimed in 65, wherein said terminating means comprises means for terminating each encoded block at an encoded pass that minimizes image distortion based on the distortion measures for a predetermined total of the rates.

67. A computer program product as claimed in 65, wherein said terminating means comprises means for terminating each encoded block at an encoded pass that minimizes a total rate based on the rates for a predetermined image distortion.

* * * * *